(12) United States Patent
Minamisawa

(10) Patent No.: US 11,243,452 B2
(45) Date of Patent: Feb. 8, 2022

(54) OPTICAL UNIT WITH SHAKE CORRECTION FUNCTION HAVING OSCILLATING MAGNET AND OSCILLATING COIL

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 496 days.

(21) Appl. No.: 16/361,477

(22) Filed: Mar. 22, 2019

(65) Prior Publication Data
US 2019/0294028 A1    Sep. 26, 2019

(30) Foreign Application Priority Data

Mar. 26, 2018 (JP) .............................. JP2018-058467
Jan. 15, 2019 (JP) .............................. JP2019-004217

(51) Int. Cl.
*G02B 27/64* (2006.01)
*G03B 5/06* (2021.01)
*H04N 5/232* (2006.01)

(52) U.S. Cl.
CPC ............. *G03B 5/06* (2013.01); *G02B 27/646* (2013.01); *H04N 5/23287* (2013.01); *G03B 2205/0023* (2013.01); *G03B 2205/0069* (2013.01)

(58) Field of Classification Search
CPC ...... G02B 7/1828; G02B 27/646; G03B 5/06; G03B 2205/0007; G03B 2205/0023; G03B 2205/0069; H04N 5/2253; H04N 5/23264; H04N 5/2328; H04N 5/23287
See application file for complete search history.

(56) References Cited

U.S. PATENT DOCUMENTS

2006/0082674 A1* 4/2006 Noji .................... H04N 5/23248
                                                              348/360
2015/0277140 A1* 10/2015 Minamisawa ......... G02B 7/026
                                                              359/557

FOREIGN PATENT DOCUMENTS

JP        2014006522 A        1/2014

* cited by examiner

*Primary Examiner* — Ryan S Dunning
(74) *Attorney, Agent, or Firm* — Cantor Colburn LLP

(57) ABSTRACT

An optical unit may include a movable body having a lens and an imaging element; a fixed body configured to support the movable body; a gimbal mechanism configured to oscillatably support the movable body; and a shake correction drive mechanism configured to cause the movable body to oscillate with respect to the fixed body around the two axial lines. The shake correction drive mechanism may include an oscillating magnet, and an oscillating coil to generate an electromagnetic force within a magnetic field of the oscillating magnet. The gimbal mechanism may include an annular movable frame surrounding a periphery of the movable body, and four oscillation support points supporting the movable frame with respect to the movable body and the fixed body on the two axial lines. The movable frame may be arranged outwardly in a radial direction perpendicular to the optical axis from the shake correction drive mechanism.

15 Claims, 15 Drawing Sheets

OPTICAL UNIT WITH SHAKE CORRECTION FUNCTION HAVING OSCILLATING MAGNET AND OSCILLATING COIL

CROSS REFERENCE TO RELATED APPLICATION

The present application claims priority under 35 U.S.C. § 119 to Japanese Application No. 2018-058467, filed Mar. 26, 2018; and Japanese Application No. 2019-004217, filed Jan. 15, 2019; the entire contents of which are incorporated herein by reference.

BACKGROUND

Field of the Invention

At least an embodiment of the present invention relates to an optical unit with a shake correction function for performing shake correction of an optical module mounted on a camera-equipped mobile terminal or the like.

Description of the Related Documents

In an optical unit used in an imaging apparatus mounted on a mobile terminal, a drive recorder, an unmanned helicopter, or the like, to suppress the disturbance in a captured image due to shake, a function has been developed to correct the shake by causing a lens (optical element) or an imaging element to oscillate to cancel the shake. In this shake correction function, a configuration is adopted in which a lens and an imaging element are oscillatably supported with respect to a fixed body such as a casing of an optical equipment, and the lens and the imaging element are oscillated in accordance with the shake by a shake correction drive mechanism.

The shake correction drive mechanism includes a magnet and a coil, and is configured to apply an electromagnetic force to an optical module including the lens and the imaging element by circulating current in a coil within a magnetic field of a magnet to drive the optical module.

For example, Japanese Unexamined Patent Application Publication No. 2014-6522 (hereinafter, referred to as Patent Literature 1) discloses an optical unit with a shake correction configured to oscillatably support an optical module with respect to a fixed body by a gimbal mechanism configured to oscillatably support the optical module around a first axial line intersecting an optical-axis direction, and oscillatably support the optical module around a second axial line intersecting the optical-axis direction and the first axial line. The gimbal mechanism of the optical unit includes, around an optical axis, a rectangular movable frame including a first corner portion, a second corner portion adjacent to the first corner portion, a third corner portion separated from the first corner portion in the direction of the first axial line, and a fourth corner portion separated from the second corner portion in the direction of the second axial line, and has a structure where the first corner portion and the third corner portion of the movable frame are oscillatably supported with respect to the fixed body, and the second corner portion and the fourth corner portion of the movable frame oscillatably support the optical module. Further, in the optical unit, a coil and a magnet constituting the shake correction drive mechanism are arranged in a space sandwiched between a side face of the optical module and a side face of a body surrounding the periphery of the optical module. Also, the optical module is provided with an optical component holding unit configured to hold an optical component, a movable frame arrangement space in which the movable frame is arranged radially outside the optical component holding unit, and a holding unit (a coil holding unit) configured to hold the coil or the magnet outside the movable frame arrangement space, in a holder for holding optical components, and the coil and the magnet constituting the shake correction drive mechanism are provided radially outside the movable frame.

[Patent Literature 1]
Japanese Unexamined Patent Application Publication No. 2014-6522.

SUMMARY

As in the optical unit described in Patent Literature 1, if the coil and the magnet constituting the shake correction drive mechanism are arranged radially outside the movable frame, the coil and the magnet are arranged at a position far away from the optical axis. At the same time, the coil and the magnet will be arranged at a position away from the first axial line and the second axial line. Therefore, the inertia increases in oscillating the optical module, and thus there occurs a problem that responsiveness declines. Moreover, the further away the position of arrangement of the coil and the magnet from the optical axis, the greater the oscillation displacement of the optical module due to the coil and the magnet when shake correction is performed. Therefore, it is necessary to secure a wide movable range of the holder holding the optical component, which increases the size of the optical unit. Further, in order to increase the oscillation displacement of the optical module due to the coil and the magnet, it is necessary to enlarge the coil and the magnet, which increases the weight of the holder. As a result, while the power consumption increases, the responsiveness of the optical module further decreases.

At least an embodiment of the present invention has been achieved in view of such circumstances, and an object thereof is to provide a small-sized optical unit with a shake correction function having excellent responsiveness of shake correction.

An optical unit with a shake correction function according to at least an embodiment of the present invention includes: a movable body having a lens and an imaging element; a fixed body configured to support the movable body; a gimbal mechanism configured to oscillatably support the movable body with respect to the fixed body around two axial lines intersecting an optical axis and intersecting each other; and a shake correction drive mechanism configured to cause the movable body to oscillate with respect to the fixed body around the two axial lines, such that the shake correction drive mechanism has an oscillating magnet, and an oscillating coil capable of generating an electromagnetic force within the magnetic field of the oscillating magnet, and the gimbal mechanism has an annular movable frame surrounding the periphery of the movable body, and four oscillation support points supporting the movable frame with respect to the movable body and the fixed body on the two axial lines, and the movable frame is arranged outwardly in the radial direction perpendicular to the optical axis from the shake correction drive mechanism.

Since the movable frame is located radially outside the shake correction drive mechanism, the shake correction drive mechanism can be arranged close to the optical axis. Also, the distance in the radial direction from the oscillation center position of the movable body up to the shake correction drive mechanism can also be shortened. This makes it possible to reduce the oscillation displacement of the movable body, and also reduce the inertia of the movable body. Therefore, it is possible to improve responsiveness at the time of shake correction and to further reduce the power consumption. Further, since the oscillation displacement of the movable body can be reduced, the size in the optical-axis direction can be reduced, because of which the optical unit with a shake correction function can be reduced in size.

In at least an embodiment of the present invention, the fixed body has a fixed body-side drive holding unit configured to hold either the oscillating magnet or the oscillating coil radially inside the movable frame, and the movable body has a movable body-side drive holding unit configured to hold the other one of the oscillating magnet and the oscillating coil at a position radially inside the fixed body-side drive holding unit and facing the fixed body-side drive holding unit.

The fixed body-side drive holding unit is provided in the fixed body supporting the movable body, and the movable body-side drive holding unit is provided in the movable body having the lens to configure the shake correction drive mechanism while assembling the fixed body and the movable body. In addition, the fixed-body-side drive holding unit of the fixed body is arranged radially inside the movable frame, and the movable body-side drive holding unit of the movable body is arranged radially inside the fixed body side drive holding unit to sequentially assemble the fixed body and the movable body from the inner side in the radial direction, and easily assemble the optical unit with the shake correction function.

In at least an embodiment of the present invention, the four oscillation support points are configured to bias the movable frame with respect to the movable body and the fixed body either radially inwardly or outwardly.

The biasing directions of the four oscillation support points are aligned in one direction to prevent the movable frame from being distorted by the pressurization of the four oscillation support points. Therefore, it is possible to stably support the movable body with respect to the fixed body without generating a gap between the movable frame and the movable body, and between the movable frame and the fixed body. Therefore, it is possible to prevent the movable frame from coming off and to smoothly drive the movable body.

In at least an embodiment of the present invention, the optical unit has four elastic members for biasing the four oscillation support points radially inwardly or outwardly, and each of the elastic members is formed in a U-shaped longitudinal section opening at one side, and the open side is aligned toward one direction in the optical-axis direction.

The open side of the elastic members are arranged to be aligned toward one direction in the optical-axis direction to easily incorporate the elastic members from one direction.

In at least an embodiment of the present invention, the four oscillation support points are arranged radially inside the movable frame.

Since the four oscillation support points are arranged inside the movable frame, the movable body need not extend up to the outer side of the movable frame. Therefore, the size in the radial direction of the movable body can be reduced, and the optical unit with a shake correction function can be further reduced in size.

In at least an embodiment of the present invention, the movable frame and the movable body are supported by two oscillation support points arranged to form a pair on a first axial line that is one of the two axial lines, out of the four oscillation support points, and the movable frame and the fixed body are supported by two oscillation support points arranged to form a pair on a second axial line that is the other one of the two axial lines, out of the four oscillation support points.

The part between the movable frame and the movable body is supported by two oscillation support points forming a pair on the first axial line and the part between the movable frame and the fixed body is supported by two oscillation support points forming a pair on the second axial line, out of the four oscillation support points, to oscillate the movable body in any direction via the movable frame.

In at least an embodiment of the present invention, the movable body includes: a sliding sleeve body having the lens, a sliding holder arranged radially outside the sliding sleeve body and having the oscillating magnet; a slide support mechanism configured to movably support the sliding sleeve body in the optical-axis direction with respect to the sliding holder; and a sliding drive mechanism configured to move the sliding sleeve body in the optical-axis direction with respect to the sliding holder, and the sliding drive mechanism has a sliding magnet to be attached to the sliding holder, and a sliding coil to be attached to the sliding sleeve body, the sliding coil capable of generating an electromagnetic force within the magnetic field of the sliding magnet.

In the optical unit with a shake correction function provided with the sliding drive mechanism, if the oscillating magnet is arranged in the fixed body and the oscillating coil is arranged in the movable body, a force that causes attraction or repulsion between the oscillating magnet and the sliding magnet is generated. Therefore, to generate the torque necessary for the oscillation of the movable body, it is necessary to increase the amount of current applied to the oscillating coil based on the attraction force or the repelling force. However, according to the present configuration, since the sliding magnet and the oscillating magnet are provided in the same sliding holder, the positional relationship between the sliding magnet and the oscillating magnet does not change, and therefore, the drive of each of the shake correction drive mechanism and the sliding drive mechanism is not hindered by the magnets (magnetic forces) of the other drive mechanisms. Therefore, it is possible to stably generate the torque necessary for causing oscillation of the movable body and the sliding movement of the sliding sleeve body. The present configuration enables improvement of the responsiveness of shake correction and autofocus, and power saving.

In at least an embodiment of the present invention, the oscillating magnet and the sliding magnet are integrally formed as a common magnet for the shake correction drive mechanism and the sliding drive mechanism.

A common magnet is provided for the oscillating magnet of the shake correction drive mechanism and the sliding magnet of the sliding drive mechanism to reduce the installation space thereof and thus reduce the number of components as compared with a case where both the magnets are separately provided. Therefore, the size of the optical unit with a shake correction function can be reduced.

In at least an embodiment of the present invention, the common magnet has a magnetization polarization line formed at the center position in the optical-axis direction of the sliding holder, and the center position in the direction along the optical-axis direction of the sliding holder in the oscillating coil and the sliding coil and the magnetization polarization line are arranged side-by-side in a radial direction perpendicular to the optical-axis direction.

A common magnet is provided for the oscillating magnet of the shake correction drive mechanism and the sliding magnet of the sliding drive mechanism to increase the size of the sliding magnet of the sliding drive mechanism in the optical-axis direction as compared with a case where both the magnets are separately provided. As a result, the magnetization polarization line of the common magnet and the center in the optical-axis direction of the oscillating coil and the sliding coil can be aligned to use the magnets in an arrangement where the highest driving force can be generated. Therefore, a large driving force can be generated in the entire sliding range, and thereby reduce power consumption by as much amount.

In at least an embodiment of the present invention, the fixed body is provided with a magnetic member facing the magnetization polarization line of the oscillating magnet in the direction perpendicular to the axial direction of the sliding holder.

At the time of non-excitation when no current is applied to the oscillating coil, the movable body can be arranged at a predetermined initial position by the suction force between the magnetic member attached to the fixed body and the oscillating magnet attached to the sliding holder (movable body). Therefore, the form of the movable body can be stabilized during non-excitation even when a separate spring member or the like is not used.

According to at least an embodiment of the present invention, it is possible to provide a small-sized optical unit with a shake correction function having excellent responsiveness of shake correction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of an optical unit with a shake correction function according to at least an embodiment of the present invention will be described below with reference to drawings.

First Embodiment (Schematic Configuration of Optical Unit 100 with Shake Correction Function)

Figure 1:
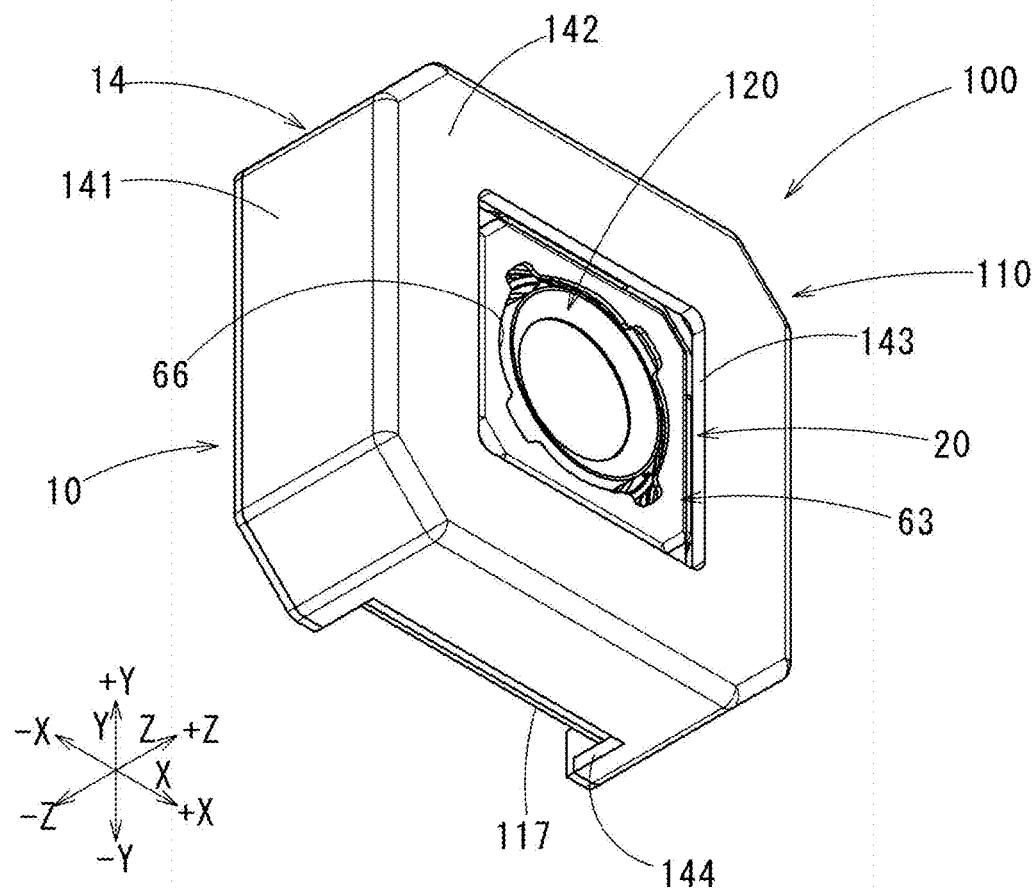
FIG. 1 is a perspective view of an optical unit with a shake correction function according to a first embodiment of the present invention.
Figure 2:
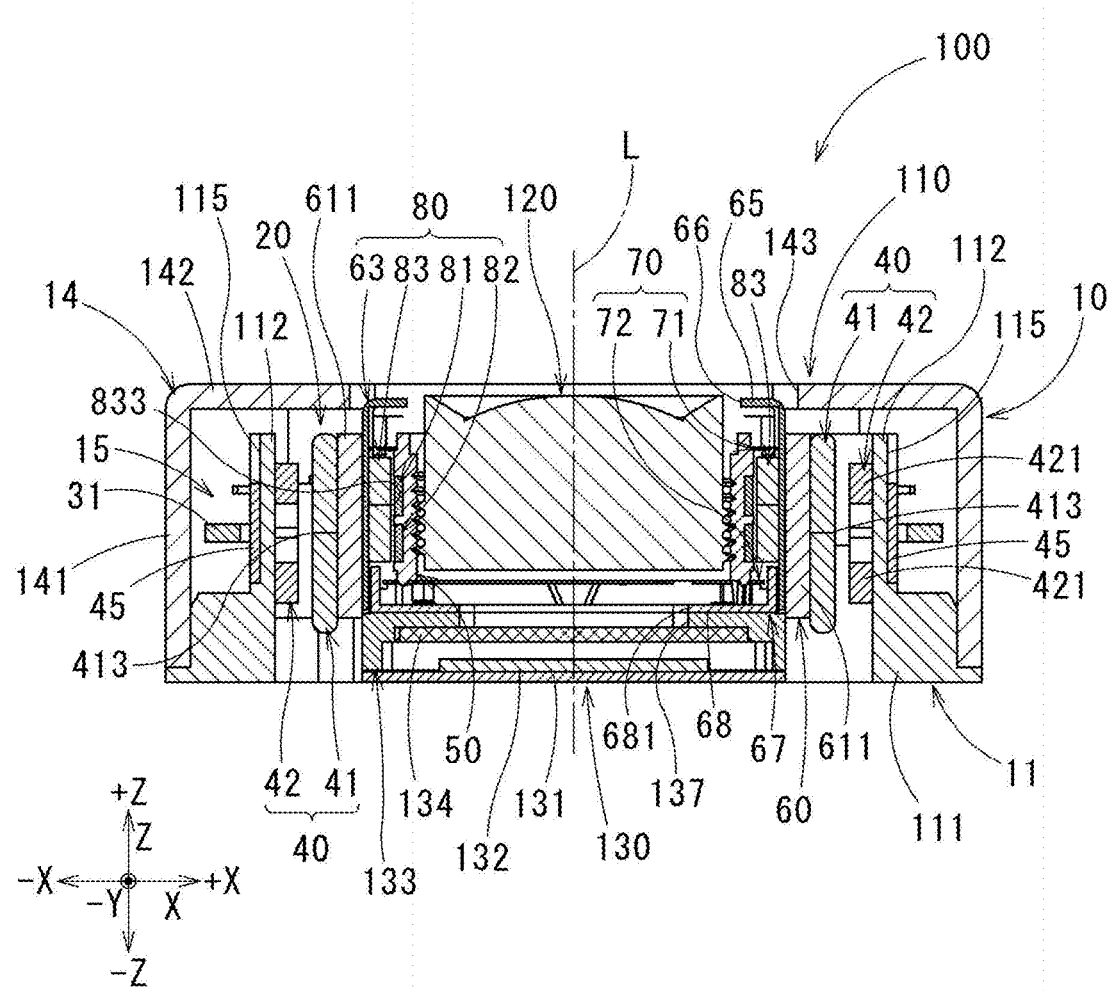
FIG. 2 is a longitudinal cross-sectional view passing through an optical axis and an X axis of the optical unit with a shake correction function.

FIG. 1 is a perspective view illustrating an appearance of an assembled state of an optical unit 100 with a shake correction function (hereinafter abbreviated as optical unit) according to a first embodiment. FIG. 2 is a longitudinal sectional view of the optical unit 100 obtained when cut along an optical axis L and an X-axis perpendicular to an optical axis.

Figure 7:
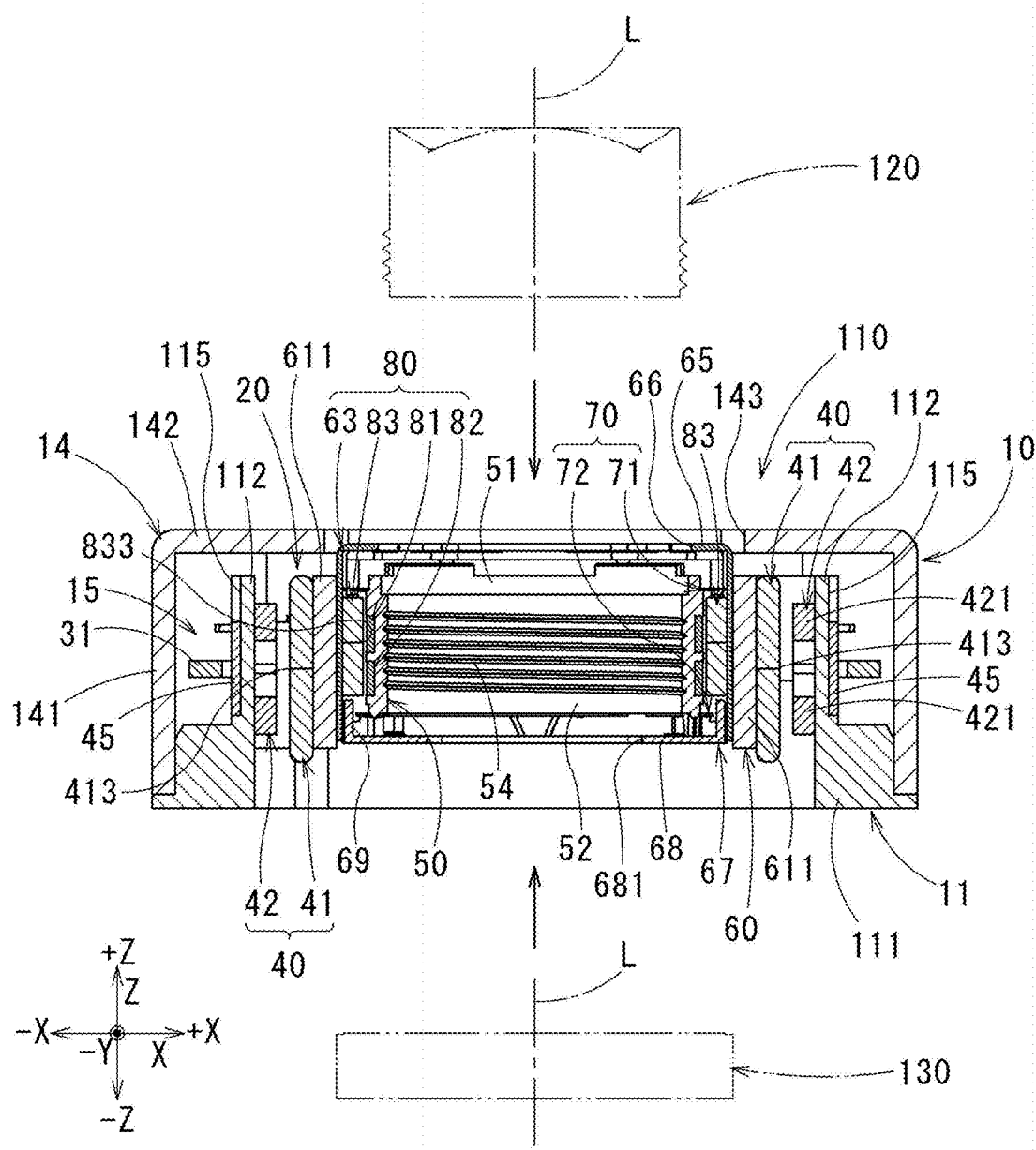
FIG. 7 is a longitudinal sectional view along an A-A line of FIG. 3.

The optical unit 100 is a thin camera incorporated in an optical equipment (not illustrated) such as an imaging apparatus mounted on a mobile terminal, a drive recorder, an unmanned helicopter or the like, and is mounted in a supported state on a chassis (device main body) of the optical equipment. The optical unit 100, as illustrated in FIG. 2 and FIG. 7, includes a shake correction apparatus 110, a lens module 120 having a lens, and a sensor module 130 having an imaging element 132 (see FIG. 17), and is configured by incorporating the lens module 120 and the sensor module 130 in the shake correction apparatus 110. The main description below is provided for a state before incorporating the lens module 120 and the sensor module 130 in the shake correction apparatus 110.

The shake correction apparatus 110 has a focus adjustment mechanism capable of adjusting the distance between the lens module 120 and the sensor module 130 in the direction of the optical axis L, and has a shake correction mechanism configured to cause the lens module 120 and the sensor module 130 to oscillate based on the detection of a shake such as the camera shake that occurs in an optical equipment, by a shake detection sensor (not illustrated) such as a gyroscope at the time of shooting, to correct the pitching and yawing.

In the following description, three directions perpendicular to one another are referred to as the X-axis direction, the Y-axis direction, and the Z-axis direction, respectively, and in a stationary state, it is assumed that the optical axis L (the optical axis of the lens/the optical axis of the optical element) of the lens module 120 and the sensor module 130 is placed in the Z-axis direction. Further, among the shakes in each of the directions, a rotation around the X-axis corresponds to a so-called pitching (vertical shake), and a rotation around the Y-axis corresponds to a so-called yawing (horizontal shake). Further, in FIG. 1 through FIG. 17, one side in the X-axis direction is denoted by +X while the other side is denoted by −X, one side in the Y-axis direction is denoted by +Y while the other side is denoted by −Y, and one side in the Z-axis direction (the side of a photographic subject/front side in the optical-axis direction) is denoted by +Z while the other side (the side opposite to the side of a photographic subject/rear side in the optical-axis direction) is denoted by −Z for description. Further, in FIG. 1 through FIG. 17, a state in which the one side +Z side is of the Z-axis is directed upward is set as the stationary state. Hereinafter, unless stated otherwise, description is given in this stationary state.

Figure 3:
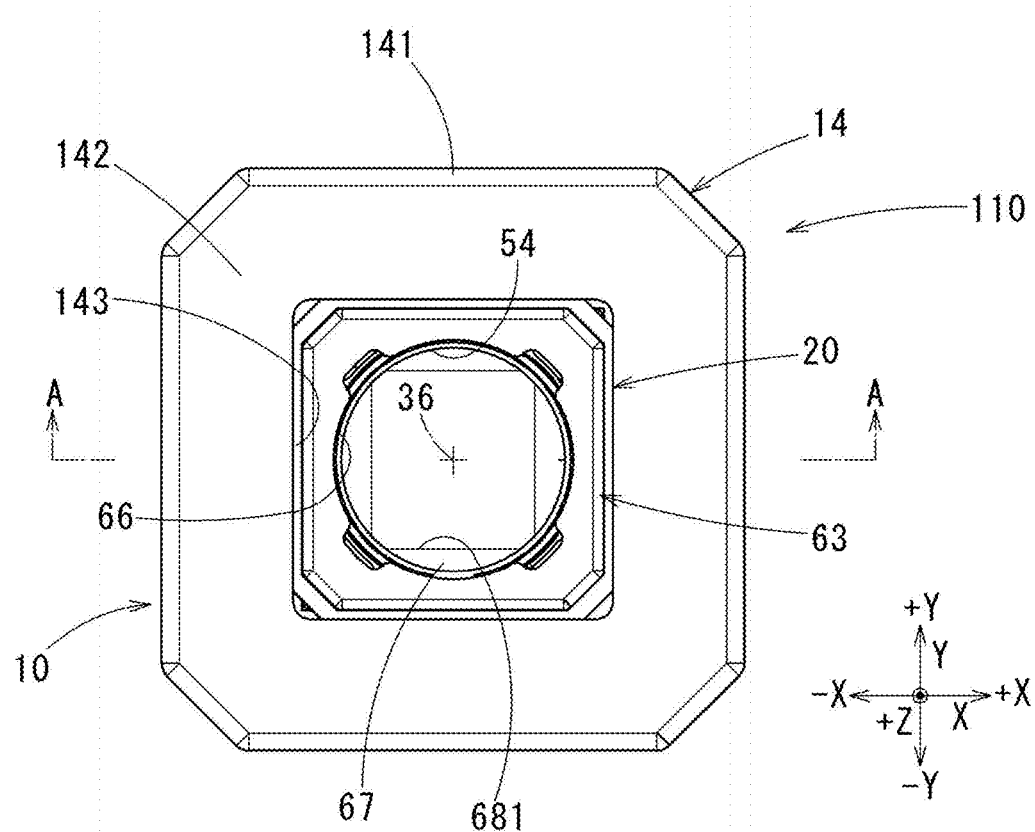
FIG. 3 is a plan view of a shake correction apparatus.
Figure 4:
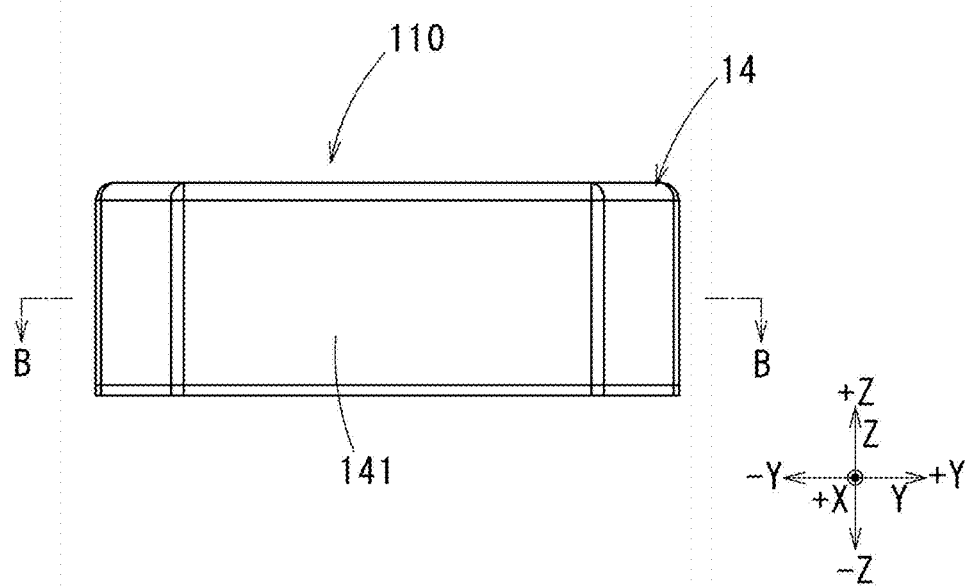
FIG. 4 is a side view of the shake correction apparatus.
Figure 5:
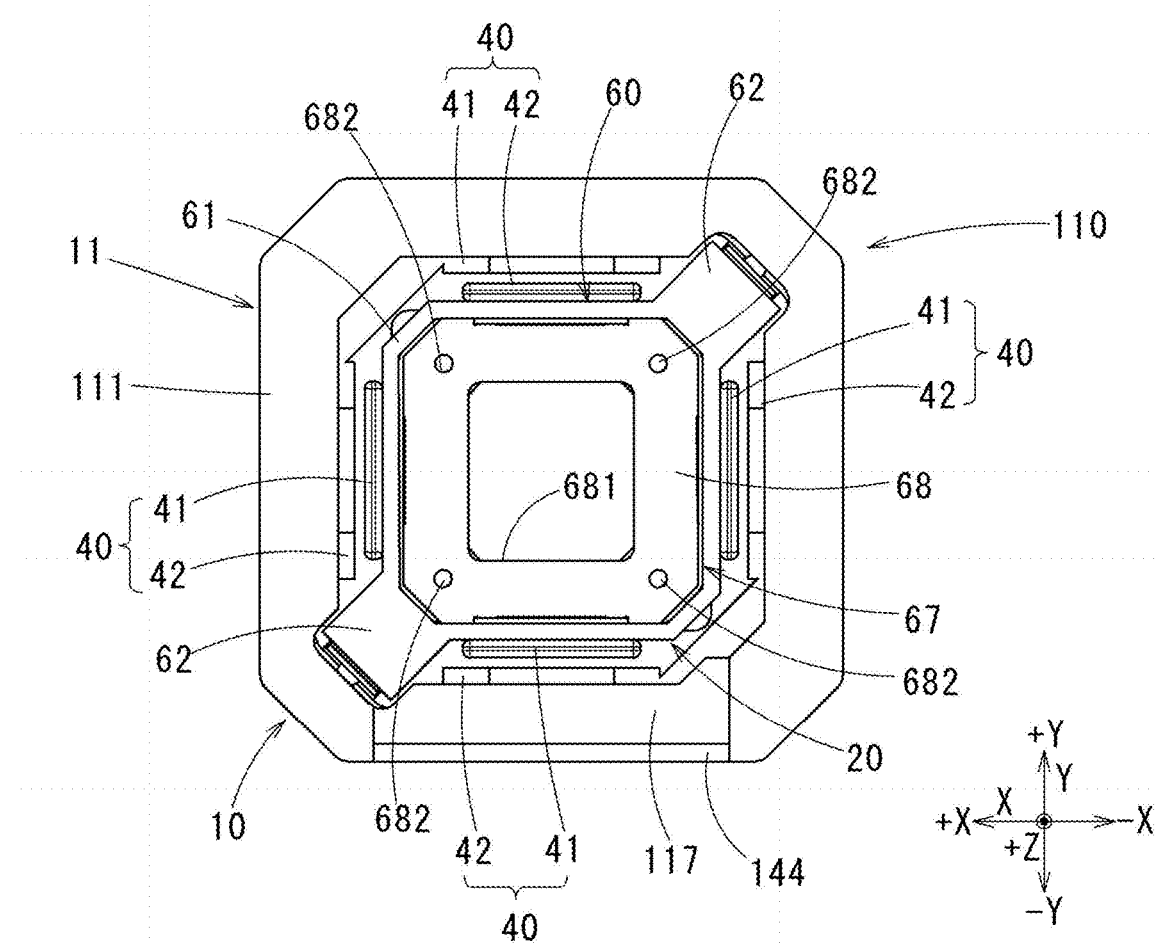
FIG. 5 is a bottom view of the shake correction apparatus.
Figure 6:
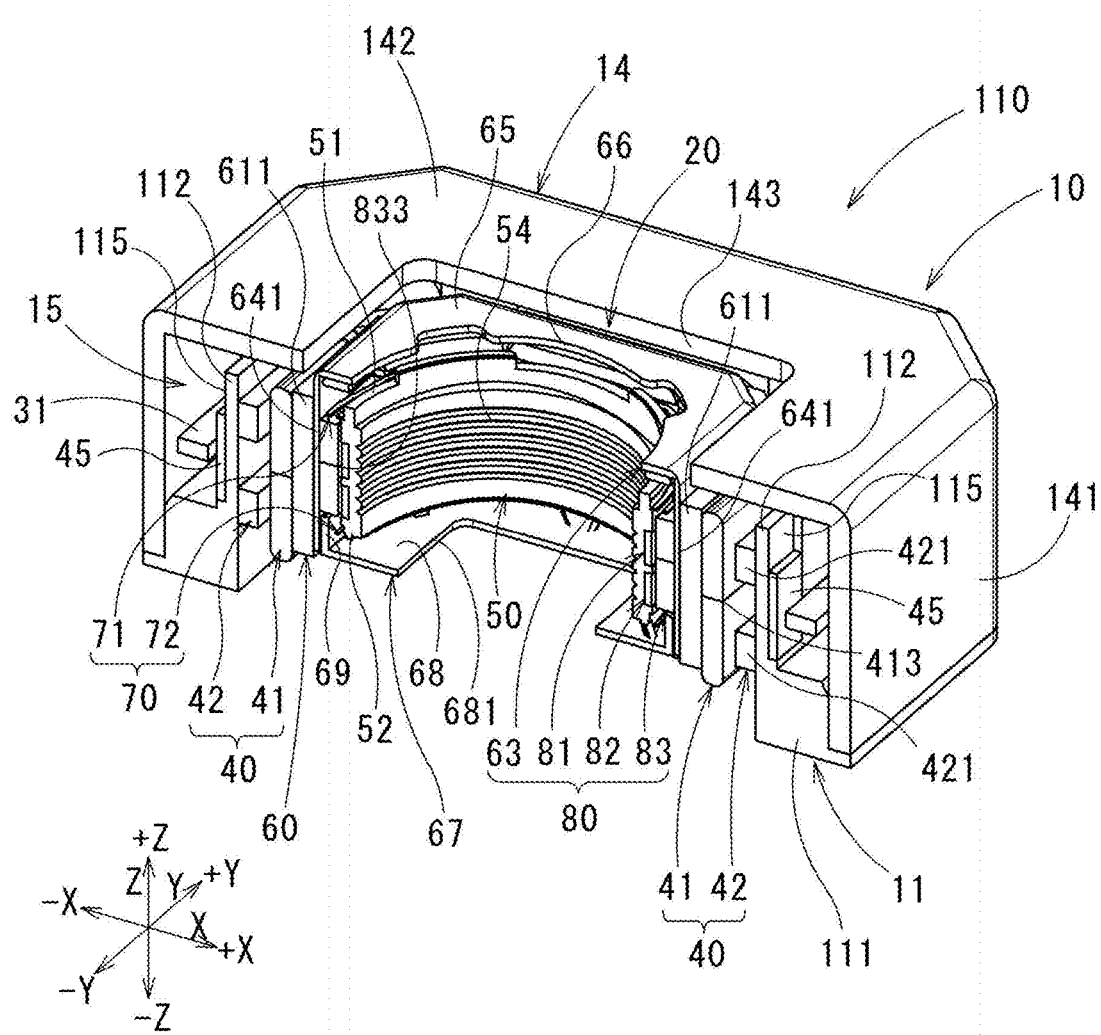
FIG. 6 is a half-sectional perspective view of the shake correction apparatus.
Figure 8:
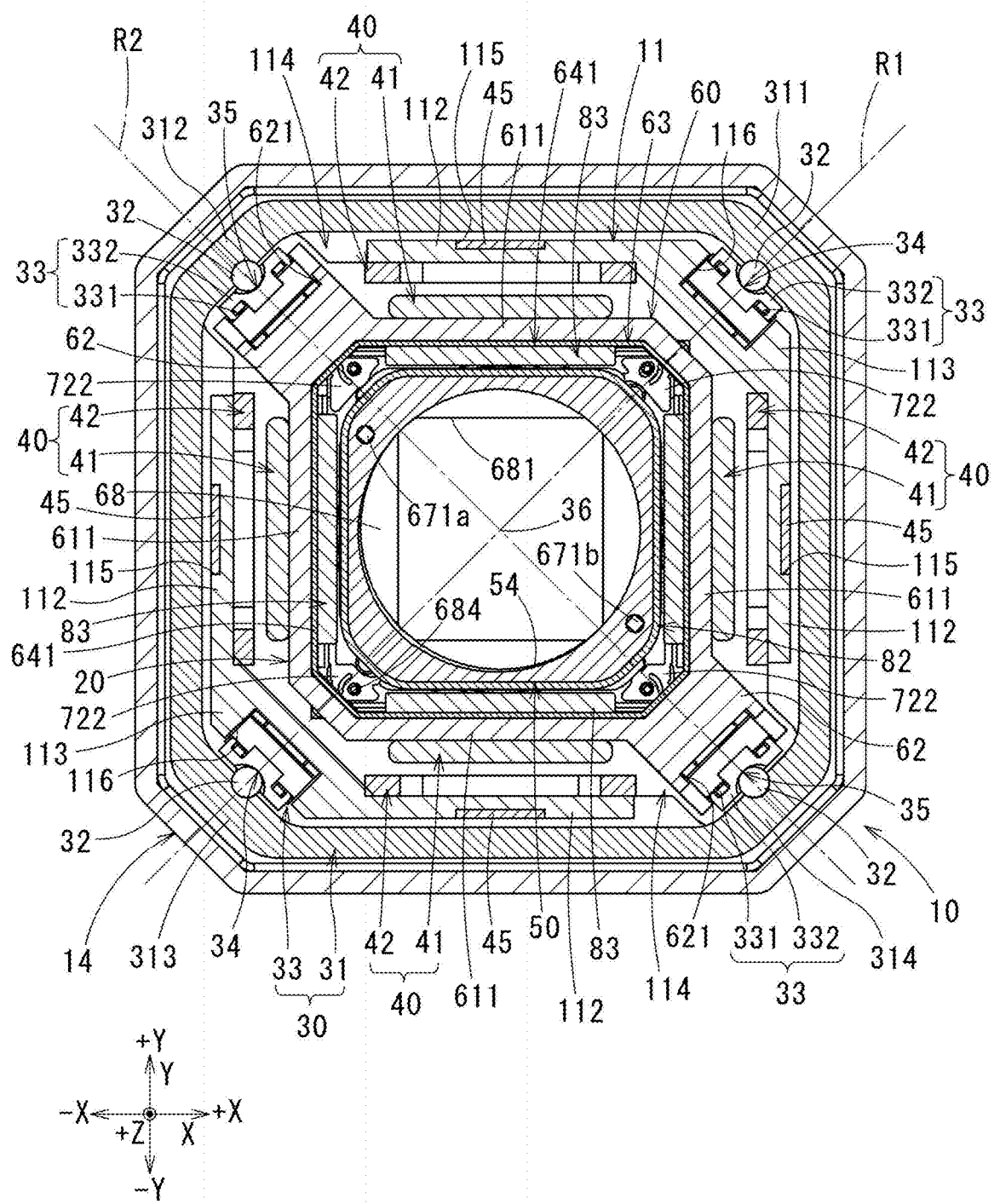
FIG. 8 is a cross-sectional view along a B-B line of FIG. 4.
Figure 9:
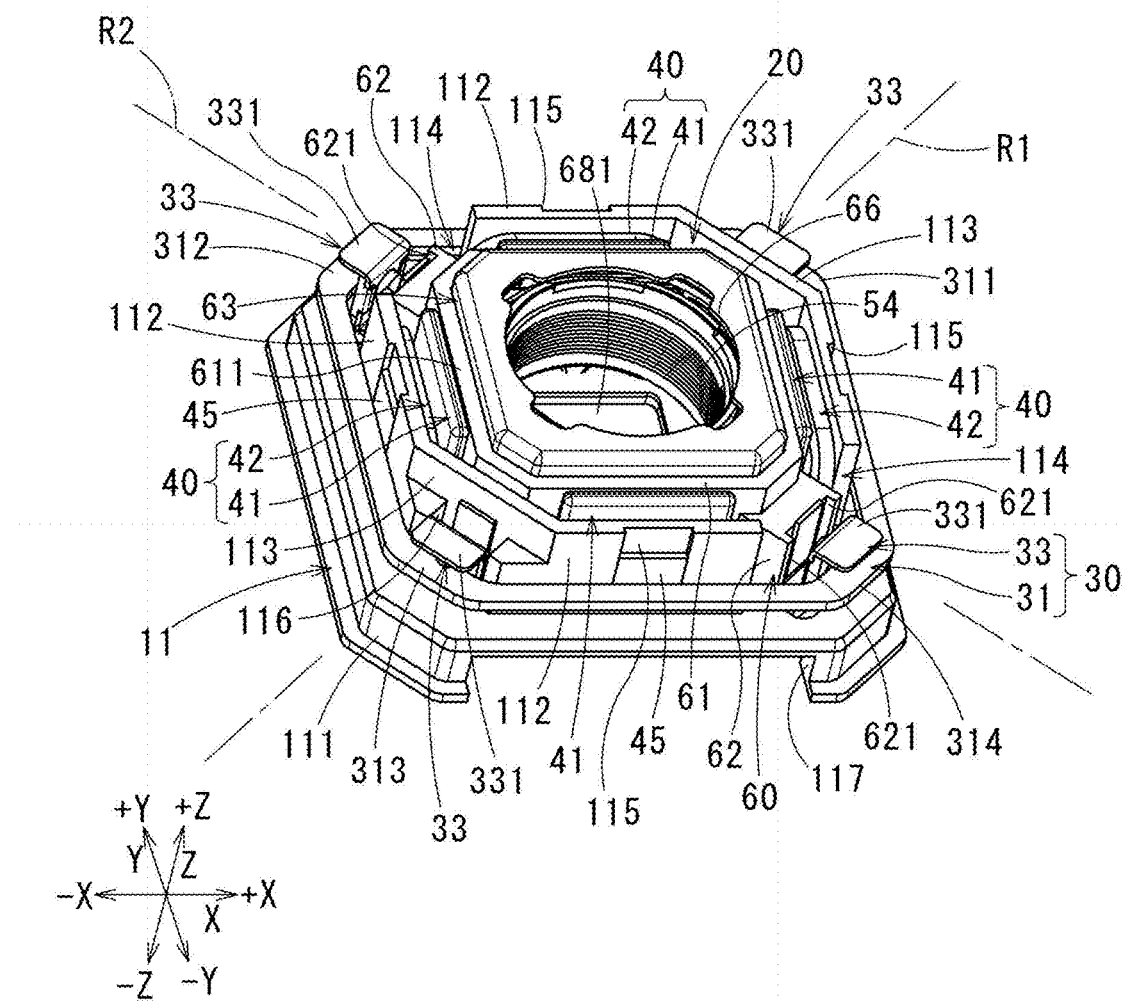
FIG. 9 is a perspective view of a state in which a cover case of the shake correction apparatus is removed.
Figure 15:
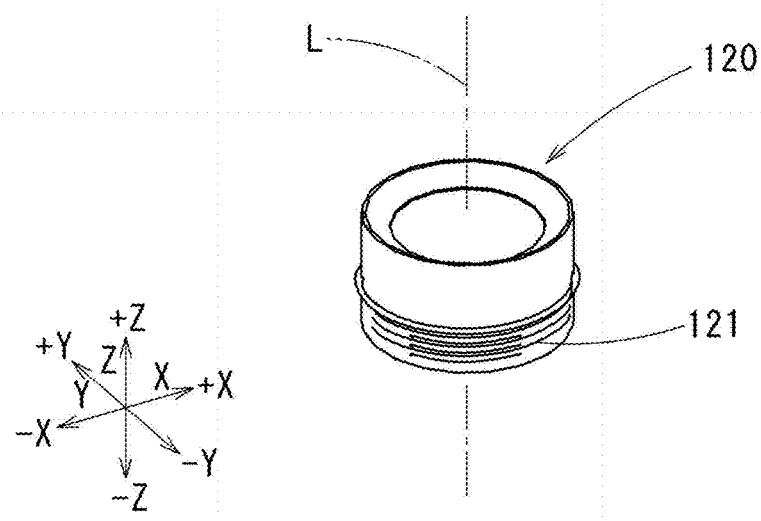
FIG. 15 is a perspective view of a lens module.
Figure 16:
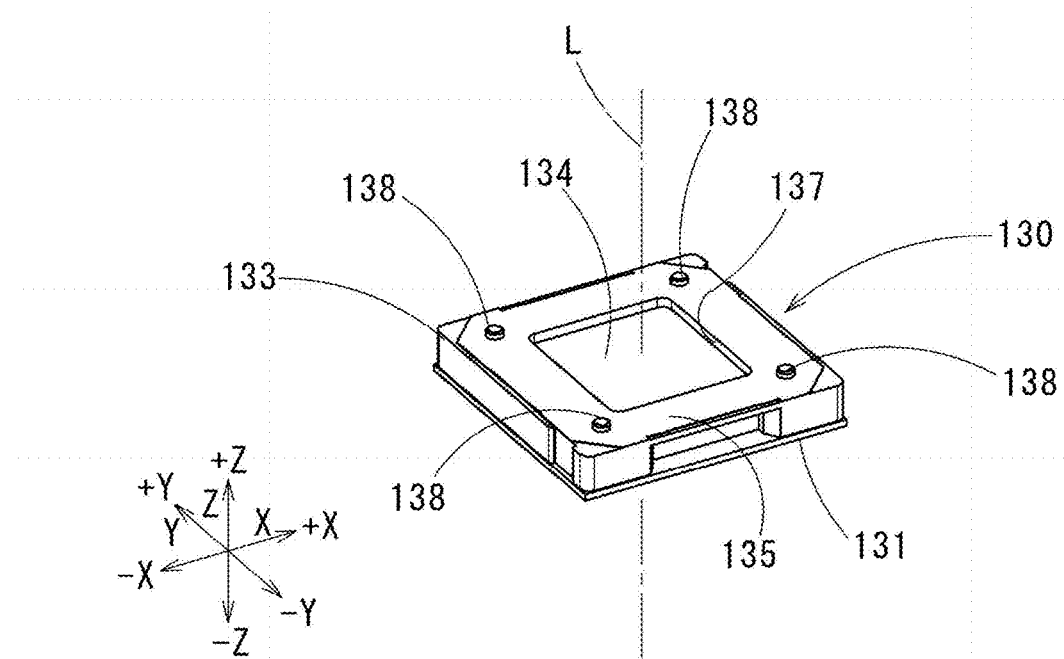
FIG. 16 is a perspective view of a sensor module.
Figure 17:
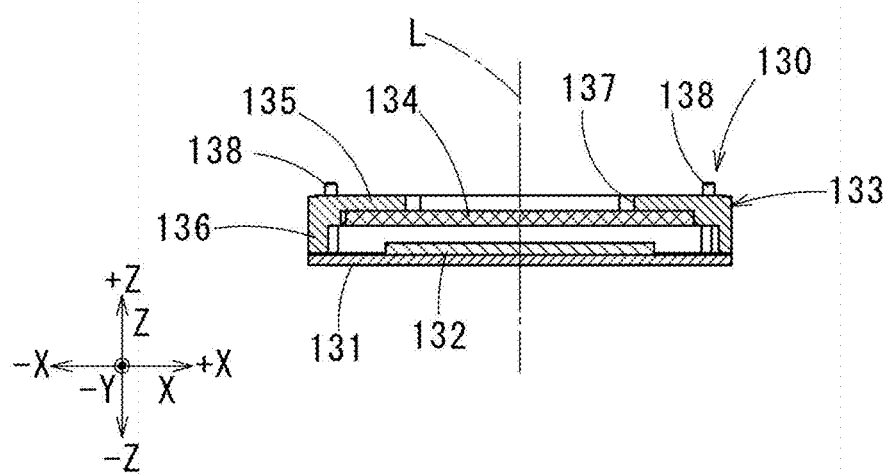
FIG. 17 is a longitudinal sectional view of the sensor module.

FIG. 3 through FIG. 5 illustrate the overall appearance of the shake correction apparatus 110, and FIG. 6 through FIG. 8 illustrate the cross-sectional structure of the shake correction apparatus 110. FIG. 9 is a perspective view of a state in which a cover case 14 is removed. FIG. 10 through FIG. 14 are exploded perspective views of the main portions of the shake correction apparatus 110. Further, FIG. 15 illustrates the lens module 120 attached to the shake correction apparatus 110, and FIG. 16 and FIG. 17 illustrate the sensor module 130.

The shake correction apparatus 110 includes a fixed body 10, a movable body 20 to which the lens module 120 and the sensor module 130 are attached, a gimbal mechanism 30 as an oscillation support mechanism for oscillatably supporting the movable body 20 with respect to the fixed body 10, a shake correction drive mechanism 40 for causing the movable body 20 to oscillate, a sleeve body 50 capable of holding the lens module 120 and a tubular holder 60 capable of holding the sensor module 130 in the movable body 20, a slide support mechanism 70 for movably supporting the sleeve body 50 in the axial direction of the sleeve body 50 (matching the direction of the optical axis L when the lens module 120 has been incorporated) with respect to the tubular holder 60, and a sliding drive mechanism 80 for moving the sleeve body 50 in the axial direction thereof. Among the constituents described above, the gimbal mechanism 30 and the shake correction drive mechanism 40 constitute a shake correction mechanism for causing the movable body 20 to oscillate with respect to the fixed body 10, and correcting the pitching and yawing. Further, the slide support mechanism 70 and the sliding drive mechanism 80 constitute a focus adjustment mechanism for adjusting a focal position of the lens module 120 with respect to the sensor module 130.

As illustrated in FIG. 8 and FIG. 9, in the present embodiment, the movable body 20 is oscillatably supported around two axial lines R1 and R2 perpendicular to the axial direction (the direction of the optical axis L) of the sleeve body 50 via the gimbal mechanism 30 with respect to the fixed body 10. Of the two axial lines R1 and R2, one of the axial lines is referred to as a first axial line R1 and the other one is referred to as a second axial line R2. The first axial line R1 and the second axial line R2 are perpendicular to each other, and are arranged at an angle of 45° with respect to the X-axial line and the Y-axial line. In the embodiment, in the plan view illustrated in FIG. 8, the first axial line R1 is a straight line passing between one side +X in the X-axial line direction and one side +Y in the Y-axial line direction, and between the other side −X in the X-axial line direction and the other side −Y in the Y-axial line direction. Further, the second axial line R2 is a straight line passing between the one side +X in the X-axial line direction and the other side −Y in the Y-axial line direction, and the other side −X in the X-axial line direction and the one side +Y in the Y-axial line direction.

It is noted that in the shake correction apparatus 110 according to the present embodiment, the fixed body 10 has a substantially square shape when viewed from one side +Z direction in the Z-axis direction (the direction of the optical axis L), and the four corners thereof have been chamfered.

(Configuration of Fixed Body 10)

As illustrated in FIG. 6, FIG. 7, FIG. 9, and FIG. 10, the fixed body 10 includes a base holder 11 configured to hold the oscillating coil 42 of the shake correction drive mechanism 40 while forming the bottom thereof, and a cover case 14 covering the base holder 11.

The base holder 11 includes a base frame unit 111 having a substantially square annular shape with the four corners having been chamfered, and a support plate unit (corresponding to the fixed body-side drive holding unit of at least an embodiment of the present invention) 112 vertically arranged on an inner periphery of the base frame unit 111 toward one side +Z in the Z-axis direction, and configured to hold the oscillating coil 42 of the shake correction drive mechanism 40.

As illustrated in FIG. 9, four support plate units 112 are vertically arranged along each side of the inner periphery of the base frame unit 111 having a substantially square shape, and each support plate unit 112 is arranged radially inside a movable frame 31 described later. In the illustrated example, of the four support plate units 112, every two adjacent support plate units 112 are coupled by a coupling unit 113. Further, each of the four support plate units 112 is provided at an interval of 90° in a circumferential direction of the base holder 11. Specifically, each of the support plate units 112 is respectively provided at the one side +X in the X-axis direction, the other side −X in the X-axis direction, the one side +Y in the Y-axis direction, and the other side −Y in the Y-axis direction. Also, the support plate units 112 provided at the one side +X in the X-axis direction and the other side −X in the X-axis direction are formed along the Y-axis direction, and the support plate units 112 provided at the one side +Y in the Y-axis direction and the other side −Y in the Y-axis direction are formed along the X-axis direction.

The coupling units 113 are respectively arranged on a set of opposite corners of the square shape, and are configured to couple the support plate unit 112 at the one side +X in the X-axis direction with the support plate unit 112 at the one side +Y in the Y-axis direction, and the support plate unit 112 at the other side −X in the X-axis direction with the support plate unit 112 at the other side −Y in the Y-axis direction. On the other hand, on the remaining opposite corners of the square shape, that is, between the support plate unit 112 at the one side +X in the X-axis direction and the support plate unit 112 at the other side −Y in the Y-axis direction, and between the support plate unit 112 at the other side −X in the X-axis direction and the support plate unit 112 at the one side +Y in the Y-axis direction, the support plate units 112 are spaced apart from each other, and an empty space 114 is formed (see FIG. 8 and FIG. 9). In other words, the empty space 114 is arranged on the second axial line R2. Further, the coupling units 113 are arranged on the first axial line R1.

A groove unit 115 configured to hold a magnetic member 45 described later is formed along the Z-axis on an outer surface side of each support plate unit 112. Specifically, in the two support plate units 112 provided at the one side +X and the other side −X in the X-axis direction, a groove unit 115 is formed on the outer surface side at a center position in the Y-axis direction. Further, in the two support plate units 112 provided at the one side +Y and the other side −Y in the Y-axis direction, a groove unit 115 is formed on the outer surface side at a center position in the X-axis direction.

Figure 10:
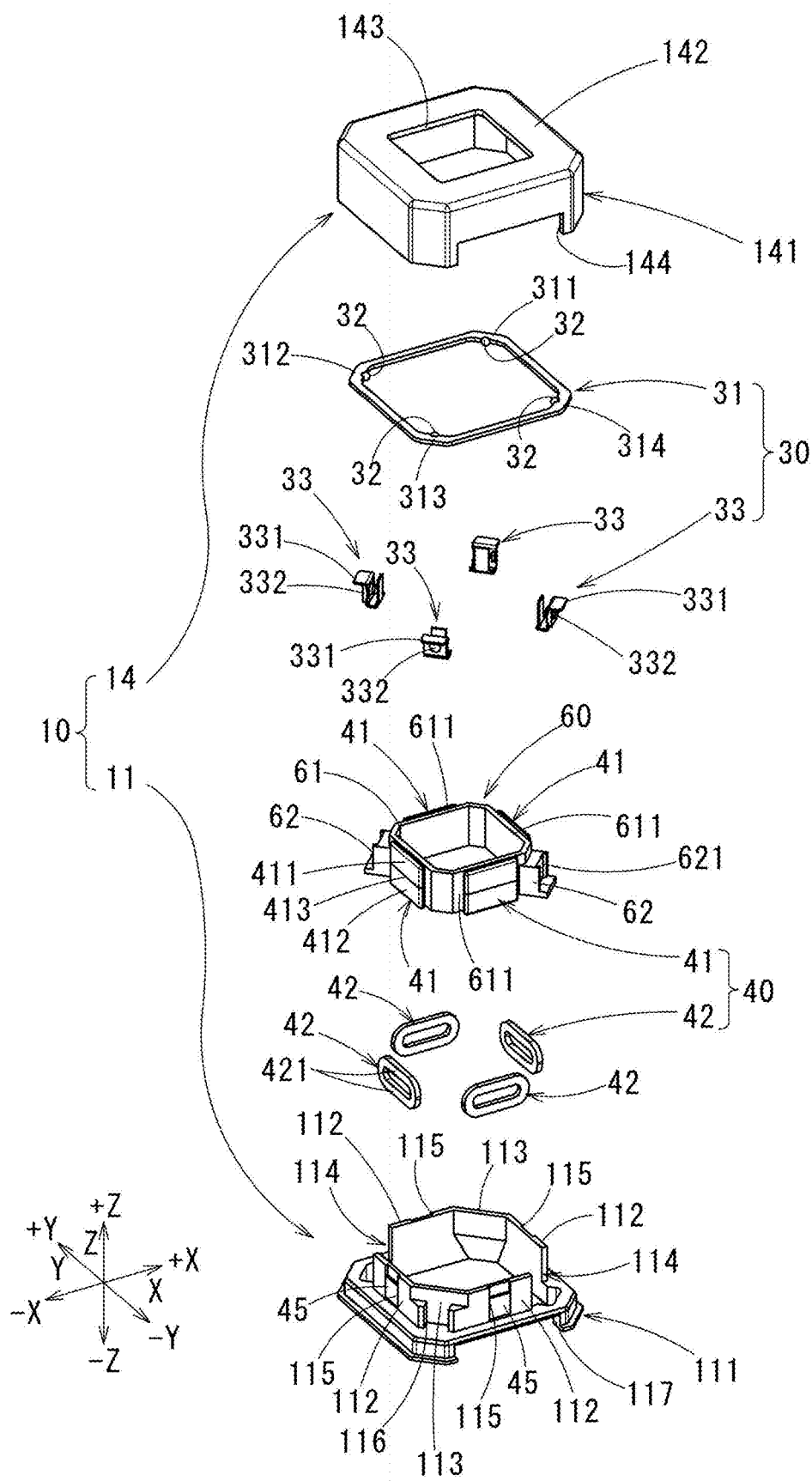
FIG. 10 is an exploded perspective view from a fixed body to a tubular holder of the movable body.

Moreover, as illustrated in FIG. 9 and FIG. 10, a groove unit 116 configured to attach a contact spring 33 of the gimbal mechanism 30 described later is formed along the Z-axis direction on an outer peripheral side of each the coupling units 113. Each groove unit 116 is arranged radially inside the movable frame 31 of the gimbal mechanism 30.

As illustrated in FIG. 7 and FIG. 10, the cover case 14 includes a tubular body 141 extending along an outer periphery of the base frame unit 111, and a top plate unit 142 provided at an upper end (the one side +Z in the Z-axis direction) of the body 141, and an opening 143 is formed in the center of the top plate unit 142. If the body 141 of the cover case 14 is attached and fixed to the base frame unit 111 of the base holder 11, a movable space arrangement space 15 for arranging the movable frame 31 of the gimbal mechanism 30 described later is formed between each support plate unit 112 of the base holder 11 and the body 141 of the cover case 14 in an annular shape in the circumferential direction.

It is noted that as illustrated in FIG. 7, notches 144 and 117 are formed in a part of the cover case 14 and the base frame unit 111 for drawing out a flexible wiring board (not illustrated) connected to the shake correction drive mechanism 40 and the sliding drive mechanism 80 arranged in the cover case 14, and the sensor module 130 or the like.

(Configuration of Movable Body 20)

As illustrated in FIG. 6 through FIG. 9, and FIG. 11, the movable body 20 includes a tubular holder (corresponding to the sliding holder of at least an embodiment of the present invention) 60 configured to hold an oscillating magnet 41 of the shake correction drive mechanism 40, the sleeve body (corresponding to the sliding sleeve body of at least an embodiment of the present invention) 50 movably supported in the Z-axis direction (the direction of the optical axis L) via the slide support mechanism 70 on an inner peripheral side of the tubular holder 60, the slide support mechanism 70 configured to movably support the sleeve body 50 movably in the Z-axis direction with respect to the tubular holder 60, and the sliding drive mechanism 80 configured to move the sleeve body 50 in the Z-axis direction with respect to the tubular holder 60.

In the tubular holder 60, a tubular portion 61 formed in a substantially rectangular tubular shape and having a square transverse cross section with the four corners having been chamfered, and two protruding portions 62 protruding outward along a diagonal line in an outer periphery on a set of opposite corners of the tubular portion 61 are integrally formed.

The tubular portion 61 includes four wall units (corresponding to the movable body-side drive holding unit of at least an embodiment of the present invention) 611 along the Z-axis direction, and the oscillating magnet 41 of the shake correction drive mechanism 40 is held (fixed) on the outer surface of each of the wall units 611. Further, each of the wall units 611 is arranged radially inside each of the support plate units 112 of the base holder 11, and at a position facing the support plate unit 112, and is arranged radially inside the movable frame 31.

Also, each of the four wall units 611 is provided at an interval of 90° in a circumferential direction of the tubular holder 60. Specifically, each of the wall units 611 is respectively arranged at the one side +X in the X-axis direction, the other side −X in the X-axis direction, the one side +Y in the Y-axis direction, and the other side −Y in the Y-axis direction, and is provided in a mutually coupled state. The wall units 611 arranged at the one side +X and the other side −X in the X-axis direction is formed along the Y-axis direction. Further, the wall units 611 arranged at the one side +Y and the other side −Y in the Y-axis direction are formed along the Y-axis direction.

Moreover, groove units 621 configured to attach the contact spring 33 of the gimbal mechanism 30 are formed along the Z-axis direction on an outer surface of both the protruding portions 62. Each of the groove units 621 is arranged radially inside the movable frame 31 of the gimbal mechanism 30.

The tubular holder 60 is arranged inside the base holder 11 of the fixed body 10, more specifically, in an inner space surrounded by the support plate unit 112. In this case, the four wall units 611 of the tubular holder 60 and the four support plate units 112 of the base holder 11 are arranged parallel to each other to face each other individually. Also, the two protruding portions 62 of the tubular holder 60 are arranged in each of the two empty spaces 114 formed between the support plate units 112 of the base holder 11. As described above, since the empty spaces 114 of the base holder 11 are arranged on the second axial line R2, both the projecting portions 62 of the tubular holder 60 are arranged on the second axial line R2.

Further, an inner case 63 is integrally provided on the inner peripheral surface of the wall unit 611 of the tubular holder 60. In the inner case 63, a tubular body 64 fixed to the inner peripheral surface of the wall unit 611 of the tubular holder 60, and an annular portion 65 formed in an inward flange shape on an upper end (the one side +Z in the Z-axis direction) of the tubular body 64 are integrally formed, and a substantially circular opening 66 is formed in the central portion of the annular portion 65.

The tubular body 64 of the inner case 63 is formed in a substantially rectangular tubular shape, and four side plate units 641 of the tubular body 64 are arranged at the one side +X and the other side −X in the X-axis direction, and at the one side +Y and the other side −Y in the Y-axis direction, respectively.

A bottom frame 67 is fixed to the lower end (the other side −Z in the Z-axis direction) of the tubular body 64. In the bottom frame 67, a bottom plate unit 68, and a plurality of rising portions 69 vertically arranged on the bottom plate unit 68 (the one side +Z in the Z-axis direction) to be fixed to the inner peripheral surface of the tubular body 64 in a fitted state are integrally formed. The bottom plate unit 68 is formed in a rectangular annular shape, and an opening 681 is formed in the center portion of the bottom plate unit 68. The opening 681 is formed in substantially the same rectangular shape as the imaging element 132. In addition, holes 682 for fitting pins 138 of the sensor module 130 described later are respectively provided in the four corners of the bottom plate unit 68 (see FIG. 14). It is noted that since the cover case 14 of the fixed body 10 does not have a bottom at the other side −Z in the Z-axis direction, the bottom plate unit 68 of the bottom frame 67 is exposed to the other side −Z in the Z-axis direction.

Further, the sleeve body 50 is supported along the Z-axis direction via the slide support mechanism 70 further inward of the inner case 63. Therefore, in the upper end (the one side +Z in the Z-axis direction) of the movable body 20, the internal space of the sleeve body 50 is opened via the circular opening 66 of the inner case 63, and in the lower end (the other side −Z in the Z-axis direction), the rectangular opening 681 of the bottom plate unit 68 of the bottom frame 67 communicates with the internal space of the sleeve body 50. Also, the opening 66 of the inner case 63 communicates with the opening 143 of the cover case 14 of the fixed body 10, and the inner space of the sleeve body 50 is opened at the one side +Z in the Z-axis direction of the sleeve 50 through the openings 66 and 143.

The sleeve body 50 has an inner peripheral surface formed in a cylindrical surface shape. Cylindrical portions 51 and 52 (see FIG. 6 and FIG. 7) are formed at both ends of the outer periphery of the sleeve body 50, however, a rectangular bobbin 53 having a square shape with the four corners having been chamfered is formed in the center portion in the length direction (the Z-axis direction), when seen from the axial direction. A female threaded portion 54 is formed on the inner periphery of the sleeve body 50 to screw a male threaded portion 121 (FIG. 15) formed on the outer periphery of the lens module 120. The diameter of the inner periphery of the sleeve body 50 and the diameter of the opening 66 of the tubular body 64 of the inner case 63 are formed to be substantially equal to each other, and the sleeve body 50 and the opening 66 of the inner case 63 are arranged on the same Z-axis (coaxially).

Figure 12:
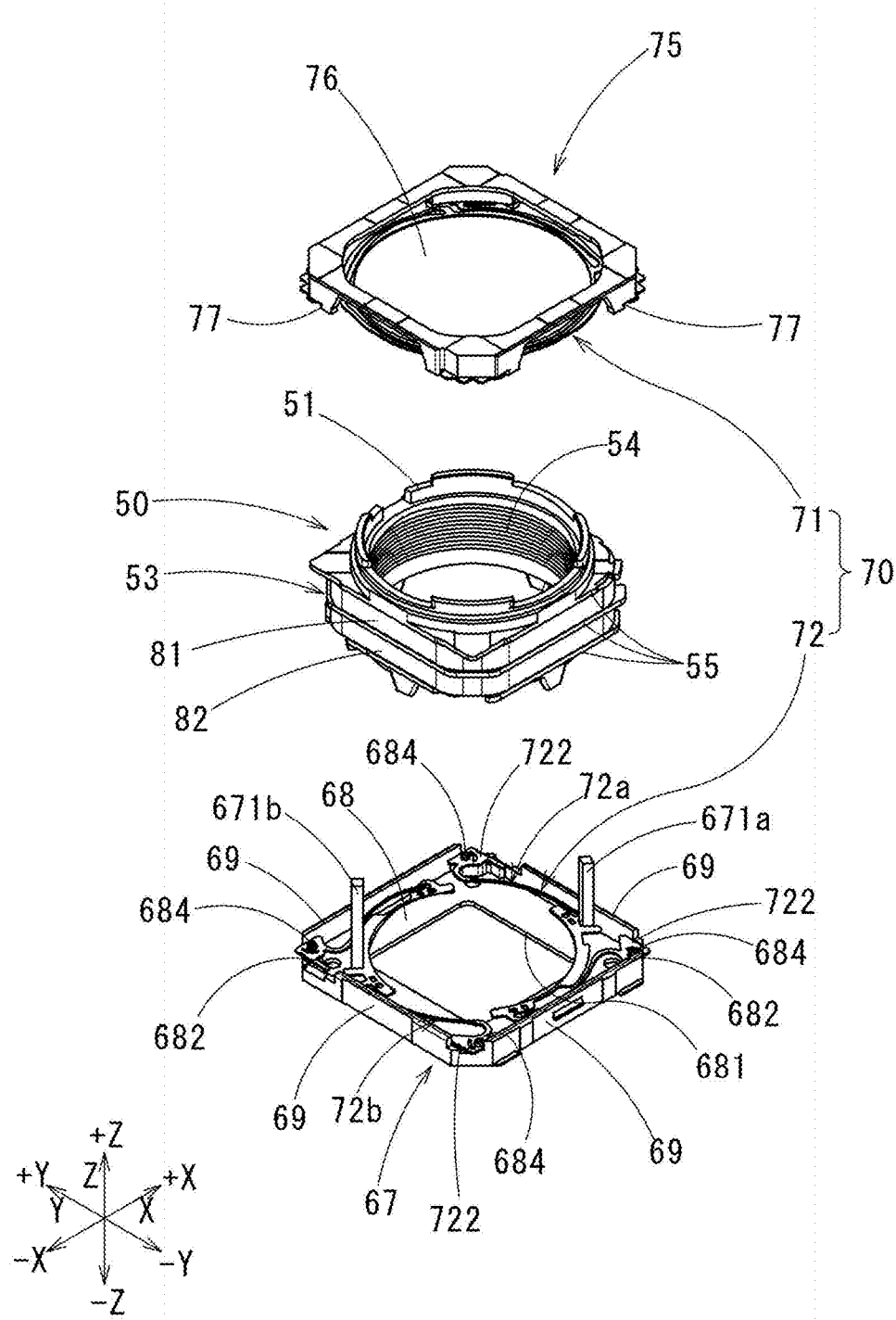
FIG. 12 is an exploded perspective view of a sleeve body and peripheral elements thereof.

It is noted that as illustrated in FIG. 12, a plurality of rib-like projections 55 are formed along the circumferential direction at predetermined intervals in the rectangular bobbin 53 of the sleeve body 50.

Out of the lens module 120 and the sensor module 130 incorporated in the movable body 20, the lens module 120 either holds one lens or holds a plurality of lens groups integrally. As illustrated in FIG. 15, the lens module 120 is formed in a columnar shape in general, and the male threaded portion 121 is formed on the outer periphery thereof. The axis of the column is the optical axis L of the lens module 120.

As illustrated in FIG. 16 and FIG. 17, the sensor module 130 includes a circuit board 131, a rectangular plate-shaped imaging element 132 mounted on the circuit board 131, a sensor cover 133 configured to cover the imaging element 132 fixed on the circuit board 131, and a filter 134 fixed to the sensor cover 133. The direction facing the filter 134 is the optical axis L of the sensor module 130 at the center in the planar direction of the imaging element 132.

The sensor cover 133 is formed in a rectangular box shape having a top plate unit 135 and a peripheral wall unit 136, and an opening 137 is formed in the center part of the top plate unit 135. The opening 137 of the top plate unit 135 is formed in a square shape having substantially the same size as the opening 681 of the bottom plate unit 68 of the bottom frame 67 escribed earlier.

The lower end (the distal end of the other side −Z in the Z-axis direction) of the peripheral wall unit 136 of the sensor cover 133 is fixed to the circuit board 131, and the filter 134 is fixed to the opening 137 of the top plate unit 135 to close the opening 137. The filter 134 is, for example, an infrared cut filter, and is arranged parallel to the imaging element at the one side +Z in the Z-axis direction of the imaging element 132. In the sensor module 130, the imaging element 132 is sealed by the circuit board 131, the sensor cover 133, and the filter 134.

Pins 138 protruding toward the one side +Z in the Z-axis direction are provided at each of the four corners of the top plate unit 135 of the sensor cover 133. Also, if the lower surface of the bottom plate unit 68 and the upper surface of the top plate unit 135 are brought into close contact with each other with the pins 138 being fitted in the holes 682 of the bottom plate unit 68 of the bottom frame 67, the opening 681 of the bottom plate unit 68 and the opening 137 of the top plate unit 135 are positioned in the X-axis direction and the Y-axis direction to establish a communicating state, and the imaging element 132 is arranged on the Z-axis at the center of the openings 681 and 137. The sensor mounting portion for mounting the sensor module 130 is composed of the bottom surface of the bottom plate unit 68 of the bottom frame 67, and the positioning portion for the sensor module 130 is composed of the pins 138 of the sensor module 130 and the holes 682 of the bottom plate portion 68.

(Configuration of Shake Correction Drive Mechanism 40)

As illustrated in FIG. 5 through FIG. 10, the shake correction drive mechanism 40 is composed of the plate-like oscillating magnet 41, and the oscillating coil 42 capable of generating an electromagnetic force within the magnetic field of the oscillating magnet 41, and the shake correction drive mechanism 40 is a magnetic drive mechanism using the oscillating magnet 41 and the oscillating coil 42. In the present embodiment, as a combination, four sets of the oscillating magnet 41 and the oscillating coil 42 are provided at an interval of 90° in the circumferential direction of the movable body 20 (the tubular holder 60).

Each of the oscillating magnets 41 is held on an outer surface of the wall unit 611 formed in the tubular holder 60 of the movable body 20, and each of the oscillating coils 42 is held on an inner surface of the support plate unit 112 formed on the base holder 11 of the fixed body 10, and the shake correction drive mechanism 40 is formed between the wall unit 611 of the tubular holder 60 and the support plate unit 112 of the base holder 11. Further, as described above, since the wall units 611 of the tubular holder 60 and the support plate units 112 of the base holder 11 are arranged radially inside the movable frame 31 of the gimbal mechanism 30, the shake correction drive mechanism 40 is arranged radially inside the movable frame 31 of the gimbal mechanism 30. In other words, the movable frame 31 of the gimbal mechanism 30 is arranged radially outside the shake correction drive mechanism 40.

As described above, the oscillating magnets 41 are respectively held on the outer surface of each of the wall units 611 arranged at an interval of 90° in the circumferential direction of the tubular holder 60. Since each of the wall units 611 is respectively arranged at the one side +X and the other side −X in the X-axis direction, and at the one side +Y and the other side −Y in the Y-axis direction, each of the oscillating magnets 41 is respectively arranged at the one side +X and the other side −X in the X-axis direction, and at the one side +Y and the other side −Y in the Y-axis direction.

In the present embodiment, the outer surface side and the inner surface side of the four oscillating magnets 41 are magnetized to different poles. Further, the oscillating magnets 41 are separated into two in the Z-axis direction to be magnetized, so that magnetic poles 411 and 412 located at the oscillating coil 42 side (the inner surface side) are different at both ends in the Z-axis direction (see FIG. 10). Therefore, a magnetization polarization line 413 separating both the magnetic poles 411 and 412 is arranged along a direction perpendicular to the Z-axis. In the two oscillating magnets 41 arranged respectively at the one side +X in the X-axis direction and the other side −X in the X-axis direction, the magnetization polarization line 413 is arranged along the Y-axis direction, and in the two oscillating magnets 41 arranged respectively at the one side +Y in the Y-axis direction and the other side −Y in the Y-axis direction, the magnetization polarization line 413 is arranged along the X-axis direction.

It is noted that the four oscillating magnets 41 are identical in magnetization pattern for the outer surface side and the inner surface side. Thus, the oscillating magnets 41 adjacent in the circumferential direction are not attracted to each other, and can therefore be easily assembled, for example. The tubular holder 60 is made of a nonmagnetic resin.

The oscillating coils 42 are air-core coils having no magnetic core (core), and are fixed on the inner surface of each of the support plate units 112 of the base holder 11, as described earlier. Since each of the support plate units 112 is respectively provided at the one side +X and the other side −X in the X-axis direction, and at the one side +Y and the other side −Y in the Y-axis direction, the oscillating coils 42 are respectively arranged at the one side +X and the other side −X in the X-axis direction, and at the one side +Y and the other side −Y in the Y-axis direction. Therefore, between the tubular holder 60 and the base holder 11, the oscillating magnets 41 and the oscillating coils 42 face each other in all of the one side +X in the X-axis direction, the other side −X in the X-axis direction, the one side +Y in the Y-axis direction, and the other side −Y in the Y-axis direction.

Further, both the oscillating coils 42 arranged at the one side +X in the X-axis direction and the other side −X in the X-axis direction of the base holder 11 are formed in an annular shape by the windings, with the X-axis direction as the axial center direction of the coil. On the other hand, both the oscillating coils 42 arranged at the one side +Y in the Y-axis direction, and the other side −Y in the Y-axis direction are formed in an annular shape by the windings, with the Y-axis direction as the axial center direction of the coil. Thus, any of the oscillating coils 42 is formed in an annular shape in which a direction perpendicular to the Z-axis direction is the axial center direction of the coil. Further, the four oscillating coils 42 are formed with the same planar shape and thickness (height) dimension.

It is noted that of the four oscillating coils 42, the two oscillating coils 42 in which the X-axis direction is the axial center direction of the coil are formed in a rectangular shape extending in the Y-axis direction. Further, the two oscillating coils 42 in which the Y-axis direction is the axial center direction of the coil are formed in a rectangular shape extending in the X-axis direction. Further, in each of the oscillating coils 42, the long sides arranged at the top and at the bottom are used as effective sides 421 facing the magnetic poles 411 and 412 of each of the oscillating magnets 41. In a state in which the oscillating coils 42 are not excited, both the effective sides 421 are parallel to the magnetization polarization line 413 of the facing oscillating magnet 41, and are arranged at equal distances vertically from the magnetization polarization line 413 (see FIG. 6 and FIG. 7). In other words, the height positions between the magnetization polarization line 413 of the oscillating magnet 41 and the coil center of the oscillating coil 42, in the Z-axis direction, coincide.

(Configuration of Gimbal Mechanism 30)

In the shake correction apparatus 110, to correct the shake in the pitching direction and the yawing direction, the movable body 20 is oscillatably supported with respect to the fixed body 10 around the first axial line R1 perpendicular to the Z-axial line direction, and is also oscillatably supported around the second axial line R2 perpendicular to the Z-axial line direction and the first axial line R1. Therefore, the gimbal mechanism (an oscillation support mechanism) 30 is configured between the fixed body 10 and the movable body 20.

In the present embodiment, the gimbal mechanism 30 includes the movable frame 31 having a rectangular annular shape surrounding the periphery of the movable body 20, and four oscillation support points for supporting the movable frame 31 on the two axial lines R1 and R2 with respect to the movable body 20 and the fixed body 10.

As illustrated in FIG. 6 and FIG. 7, in terms of an arrangement along the X-axis direction, the movable frame 31 is arranged in the movable frame arrangement space 15 formed between the support plate units 112 of the base holder 11 of the fixed body 10 and the body 141 of the cover case 14. In terms of an arrangement along the Z-axis direction, the movable frame 31 is arranged between the lower surface (the surface of the other side −Z in the Z-axis direction) of the top plate unit 142 of the cover case 14 of the fixed body 10, and the upper surface (the surface of the one side +Z in the Z-axis direction) of the base frame unit 111 of the base holder 11.

In the present embodiment, the movable frame 31 is formed in a rectangular annular plate shape by a metallic material or the like having spring property. As illustrated in FIG. 10, in the movable frame 31, if the four corner portions 311 to 314 arranged at an interval of 90° in the circumferential direction are assumed to be a first corner portion 311, a second corner portion 312, a third corner portion 313, and a fourth corner portion 314 in a circumferential direction around the Z axis, a spherical body 32 is fixed on an inner side of the corner portions 311 to 314 by welding or the like to further face a hemispherical convex surface radially inward.

The movable frame 31 is arranged in the movable frame arrangement space 15 with the surface of the plate being perpendicular to the Z-axis. Further, of the four spherical bodies 32 provided on the inner side of the movable frame 31, two spherical bodies 32 positioned on a diagonal, specifically, the two spherical bodies 32 fixed to the first corner portion 311 and the third corner portion 313 are arranged in a direction in which the first axial line R1 extends. Further, two spherical bodies 32 positioned on the other diagonal, that is, the two spherical bodies 32 fixed to the second corner portion 312 and the fourth corner portion 314 are arranged in a direction in which the second axial line R2 extends. (see FIG. 8 and FIG. 9).

Also, the two spherical bodies 32 arranged in the direction of extension of the first axial line R1 are supported by the contact spring 33 provided in the base holder 11 of the fixed body 10, and the two spherical bodies 32 arranged in the direction of extension of the second axial line R2 are supported by the contact spring 33 fixed in the tubular holder 60 of the movable body 20.

The two coupling units 113 of the base holder 11 in the fixed body 10 are positioned on a diagonal in the direction of extension of the first axial line R1, and the contact spring 33 is attached to each groove unit 116 formed on the outer surface of the coupling units. And, each of the two spherical bodies 32 of the movable frame 31 positioned on a diagonal in the direction of extension of the first axial line R1 is supported by the contact springs 33.

On the other hand, the two protruding portions 62 of the tubular holder 60 in the movable body 20 are positioned on a diagonal in the direction of extension of the second axial line R2, and the contact spring 33 is attached to each groove unit 621 formed on the outer surface of the protruding portions 62. And, each of the two spherical bodies 32 of the movable frame 31 positioned on a diagonal in the direction of extension of the second axial line R2 is supported by the contact springs 33.

Each of the contact springs 33 is composed of a spring piece (corresponding to the elastic member of at least an embodiment of the present invention) 331 formed by bending a plate member made of a metal such as elastically deformable stainless steel by press-forming into a U-shaped longitudinal section opening on one side, and a bearing member 332 made of resin provided in a portion where the spherical bodies 32 of the movable frame 31 come in contact with the spring piece 331.

Both the coupling units 113 of the base holder 11 for attaching the contact springs 33, as well as each of the groove units 116 and 621 of the protruding portions 62 of the tubular holder 60 are provided radially outward with respect to the center along the Z-axis of the base holder 11 and the tubular holder 60. In addition, each of the groove units 116 and 621 opens toward the one direction +Z side in the Z-axis direction. Also, the contact springs 33 are arranged to align the open side toward the one side +Z in the Z-axis direction while biasing the bearing member 332 outwardly (radially outwardly), and the contact springs 33 are supported by each of the groove units 116 and 621. Further, the movable frame 31 is arranged further outside the coupling units 113 of the base holder 11 and the protruding portions 62 of the tubular holder 60, and the spherical bodies 32 inside the movable frame 31 elastically abuts the bearing members 332 of each of the contact springs 33 from the outer side. Conversely, each of the contact springs 33 elastically presses the spherical bodies 32 from the inner side of the movable frame 31, and biases the spherical bodies 32 in one direction, that is, toward the outer side from the inner side in the radial direction.

In this case, as illustrated in FIG. 8, the contact springs 33 fixed to the base holder 11 are arranged to form a pair in the direction of the first axial line R1, and configure two first oscillation support points 34 between the contact springs 33 and the spherical bodies 32 of the movable frame 31. Also, the movable frame 31 and the movable body 20 are supported by the two first oscillation support points 34. On the other hand, the contact springs 33 fixed to the tubular holder 60 are arranged to form a pair in the direction of the second axial line R2, and configure two second oscillation support points 35 between the contact springs 33 and the spherical bodies 32 of the movable frame 31. Also, the movable frame 31 and the fixed body 10 are supported by the two second oscillation support points 35. Therefore, the oscillation center position 36 of the movable body 20 is arranged at the intersection of the first axial line R1 and the second axial line R2 in which the first oscillation support point 34 and the second oscillation support point 35 are combined, and the movable body 20 can be made to oscillate in any direction via the movable frame 31.

In this way, since each of the spherical bodies 32 of the movable frame 31 is oscillatably in contact with the contact springs 33, the tubular holder 60 of the movable body 20 is oscillatably supported with respect to the base holder 11 of the fixed body 10. Further, in the gimbal mechanism 30 thus configured, a biasing force of each of the contact springs 33 is set equally. It is noted that in the present embodiment, a magnetic drive mechanism is used for the shake correction drive mechanism 40, and thus, both the movable frame 31 and the contact spring 33 used for the gimbal mechanism 30 are made from a nonmagnetic material.

Further, in the present embodiment, as illustrated in FIG. 7, as seen from the direction perpendicular to the Z-axis, the movable frame 31 of the gimbal mechanism 30 is arranged at a position overlapping with the center position in the Z-axis direction of the shake correction drive mechanism 40. That is, in a non-excited state of the shake correction drive mechanism 40, the gimbal mechanism 30 is provided at the same height position as the magnetization polarization line 413 of the oscillation magnets 41 in the Z-axis direction. Therefore, the first oscillation support point 34 and the second oscillation support point 35 of the gimbal mechanism 30 are arranged at positions overlapping with the center position of the shake correction drive mechanism 40 in the Z-axis direction, and the oscillation center position 36 of the movable body 20 is also arranged at a position overlapping with the center position of the shake correction drive mechanism 40.

(Configuration of Magnetic Spring Mechanism)

The magnetic member 45 is provided in each of the groove units 115 on the outer side of the central portion of each of the support plate units 112 in the base holder 11. The magnetic member 45 is formed in a square plate shape in a plan view, and is provided on the outer surface of the support plate unit 112 to face the magnetization polarization line 413 of the oscillating magnet 41 of the drive correction mechanism 40 in the radial direction perpendicular to the Z-axis direction. In this case, the magnetic members 45 are arranged so that the magnetization polarization line 413 of the oscillating magnets 41 and the coil center of the oscillating coil 42 that form a set in the shake correction drive mechanism 40, and the center position of the magnetic member 45s in the Z-axis direction are at the same height position.

Also, the magnetic member 45 applies a biasing force in the Z-axis direction for the movable body 20 by a magnetic force (attraction force) acting between the magnetic member 45 and the oscillating magnet 41 in the shake correction drive mechanism 40, thus constituting a magnetic spring mechanism for initial position return for the movable body 20. Therefore, when the shake correction drive mechanism 40 is not energized (in a non-excited state), the movable body 20 can be arranged at a predetermined initial position by the attraction force between the magnetic member 45 and the oscillating magnet 41, and the movable body 20 can be prevented from being displaced by its own weight or the like. Thereby, it is possible to maintain the desired form of the movable body 20 and to further improve the impact resistance. Moreover, the magnetic member 45 acts as a type of a back yoke, and it is possible to reduce the leakage flux from a magnetic path formed between the oscillating magnet 41 and the oscillating coil 42. A magnet may be used as the magnetic member 45.

(Configuration of Slide Support Mechanism 70)

The sleeve body 50 is arranged in the inner case 63 along the Z-axis direction. Also, the slide support mechanism 70 includes a distal end spring member 71 configured to support an end at the one side +Z in the Z-axis direction of the sleeve body 50, and a rear end spring member 72 configured to support an end at the other side −Z in the Z-axis direction of the sleeve body 50.

Figure 11:
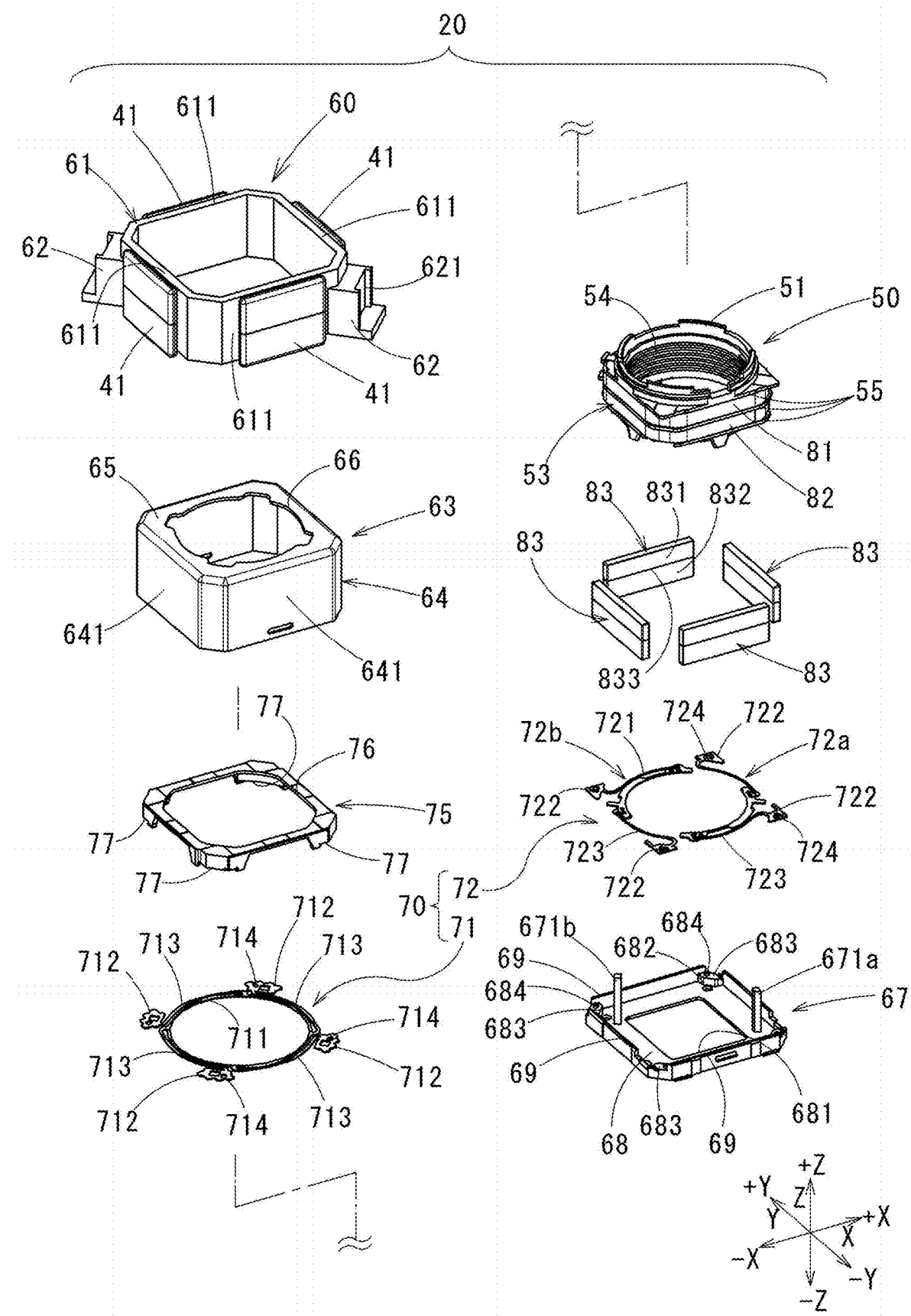
FIG. 11 is an exploded perspective view of a movable body.
Figure 13:
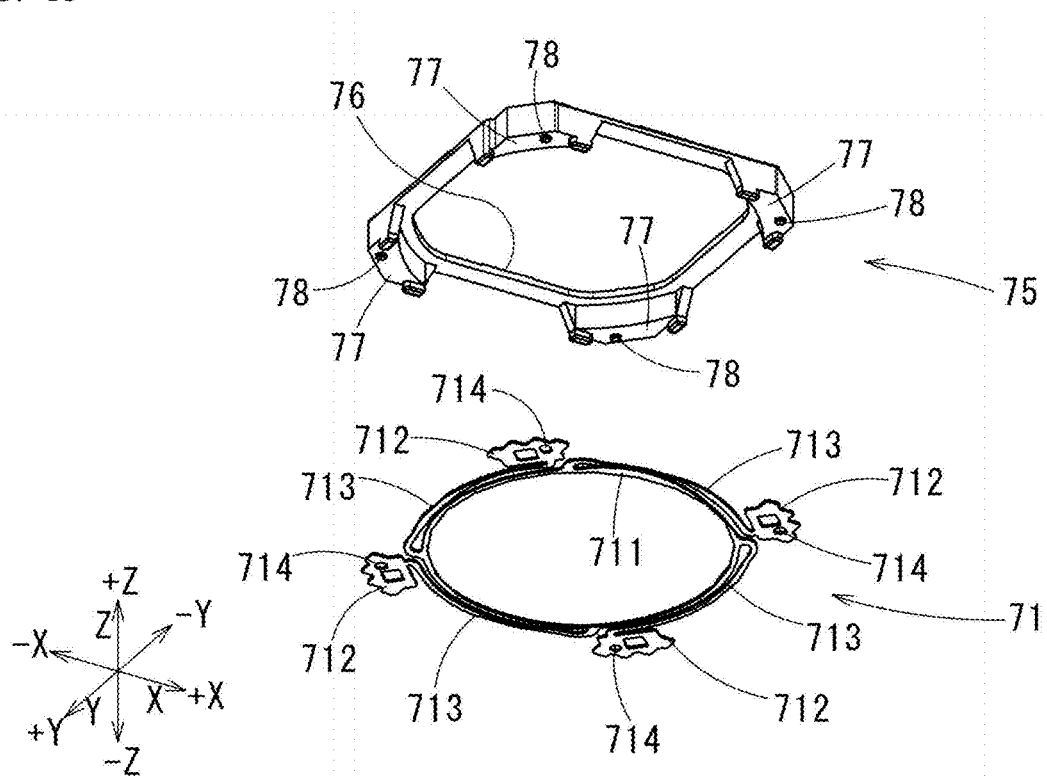
FIG. 13 is a perspective view of a spacer member and a distal end spring member.
Figure 14:
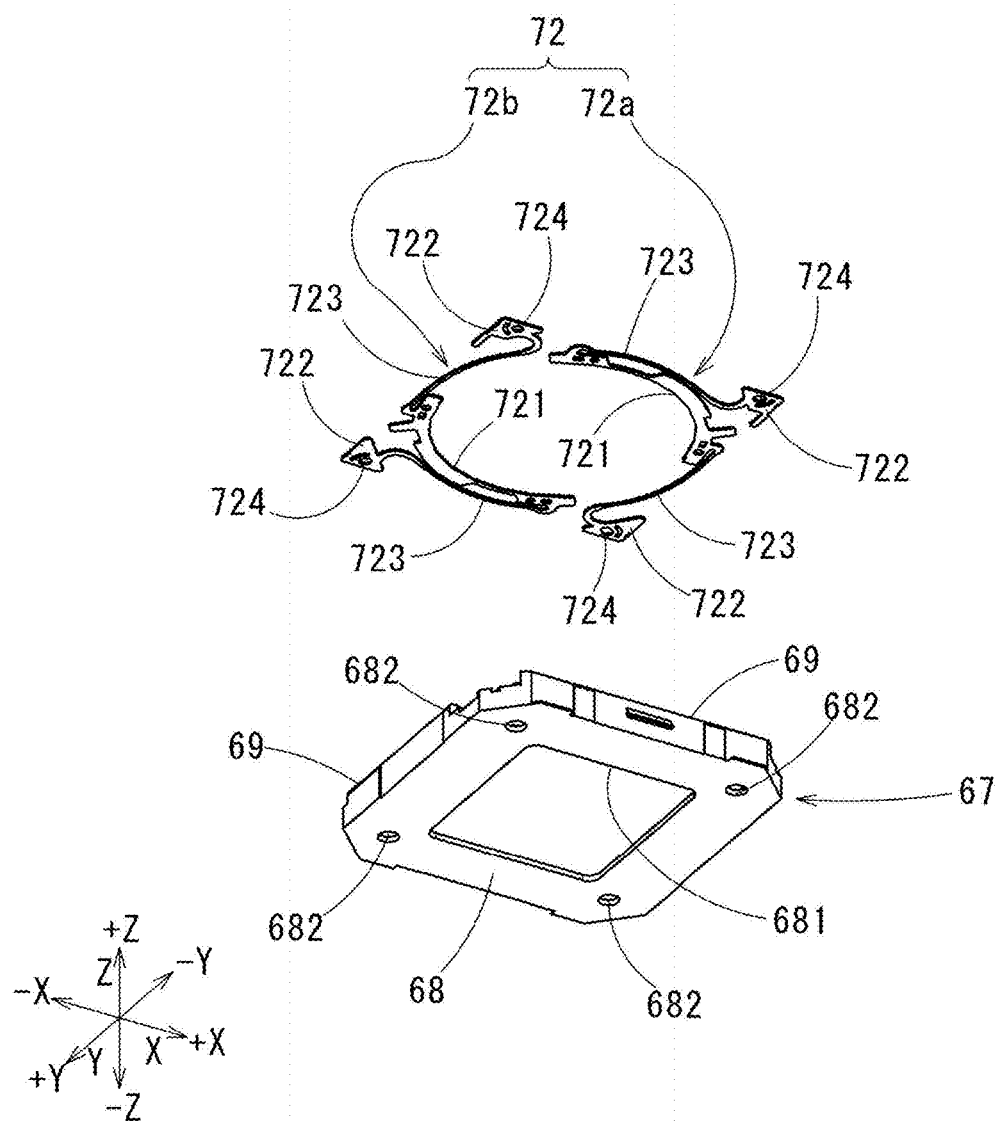
FIG. 14 is a perspective view of a rear end spring member and a bottom frame.

As illustrated in FIG. 11, a spacer member 75 is fixed on an inner surface of the annular portion 65 of the inner case 63 to support the distal end spring member 71. As illustrated in FIG. 11 through FIG. 13, the spacer member 75 is formed in a rectangular frame shape having an opening 76 in the center, and is provided with a spring attachment portion 77 of the distal end spring member 71 at the four corners on the back surface (of the surface at the other side −Z in the Z-axis direction).

Also, the spacer member 75 is fixed to the inner surface of the inner case 63 in a state where the opening 76 thereof is in communication with the opening 66 of the inner case 63. Further, a boss portion 78 is formed to protrude toward the other side −Z in the Z-axis direction in the spring attachment portion 77 at the four corners.

On the other hand, a spring attachment portion 683 is formed at the four corners on the upper surface (the surface of the one side +Z in the Z-axis direction) of the bottom plate unit 68 of the bottom frame 67, and a boss portion 684 is formed to protrude toward the one side +Z in the Z-axis direction in the spring attachment portion 683.

The distal end spring member 71 includes an annular sleeve-side coupling unit 711 coupled to a cylindrical portion 51 at the distal end side of the sleeve body 50, four support body-side coupling units 712 fixed to the spacer member 75 on the outer peripheral side from the sleeve-side coupling unit 711, and four arm units 713 configured to couple the support body-side coupling units 712 and the sleeve-side coupling unit 711. The sleeve-side coupling unit 711 is located on the inner periphery side of the support body-side coupling units 712. The four arm units 713 are coupled to four locations spaced apart by 90° in the circumferential direction of the sleeve-side coupling unit 711, and extend along the circumferential direction of the sleeve-side coupling unit 711 on the outer side of the sleeve-side coupling unit 711 at a length of approximately 90°. Each of the four support body-side coupling units 712 is held at an interval of 90° in the circumferential direction by an arm unit 713 on the outer side of the sleeve-side coupling unit 711, and a hole 714 is formed in each of the four support body-side coupling units 712 for fitting each of the boss portions 78 of the spacer member 75.

Also, the inner periphery of the sleeve-side coupling unit 711 is coupled to the sleeve body 50, and each of the support body-side coupling units 712 is fixed to the spring attachment portion 77 of the spacer member 75 with the boss portions 78 being fitted into the holes 714 thereof. Thus, the sleeve body 50 is supported on the inner side of the spacer member 75.

On the other hand, the rear end spring member 72 includes a sleeve-side coupling unit 721 coupled to the cylindrical portion 52 at the rear end side of the sleeve body 50, four support body-side coupling units 722 coupled to the bottom frame 67 on the outer peripheral side from the sleeve-side coupling unit 721, and four arm units 723 configured to couple the support body-side coupling units 722 and the sleeve-side coupling unit 721. In this case, unlike the distal end spring member 71, the rear end spring member 72 is divided into two spring pieces 72a and 72b. Therefore, the sleeve-side coupling unit 721 of the rear end spring member 72 is divided into two, and two arm units 723 are respectively provided in each of the sleeve-side coupling units 721, and a support body-side coupling unit 722 is provided at the distal end of each of the arm units 723. Moreover, holes 724 for fitting the boss portions 684 of the spring attachment portion 683 of the bottom frame 67 are formed in each of the support body-side coupling units 722.

Also, the inner periphery of the sleeve-side coupling unit 721 is coupled to the sleeve body 50, and each of the support body-side coupling units 722 is fixed to the spring attachment portion 683 of the bottom frame 67 with the boss portions 684 being fitted into the holes 724 thereof so that the sleeve body 50 is supported by the bottom frame 67.

In this supported state, as illustrated in FIG. 6 and FIG. 7, the sleeve body 50 is arranged so that an intermediate position in the direction of the optical axis L between the sleeve body 50 and a sliding coil (the first coil 81 and the second coil 82 described later) on the outer periphery thereof is displaced to the other side −Z in the Z-axis direction from the magnetization polarization line 833 of the sliding magnet 83 in the inner case 63. As a result, the sliding magnet 83 applies a magnetic force to the sliding coils 81 and 82 to bias the sleeve body 50 toward the one side +Z in the Z-axis direction.

Out of the rear end spring member 72 and the distal end spring member 71, the rear end spring member 72 arranged in the bottom frame 67 is divided into the two spring pieces 72a, 72b as described earlier, and each of the two ends (the winding start end and the winding termination end) of the first coil 81 and the second coil 82 is electrically connected to the spring pieces 72a and 72b. In addition, each of the two spring pieces 72a and 72b is electrically connected to terminal pins 671a and 671b held by the bottom frame 67. Therefore, the rear end spring member 72 (the spring pieces 72a and 72b) functions as a power supply member for the first coil 81 and the second coil 82.

(Configuration of Sliding Drive Mechanism 80)

The sliding drive mechanism 80 includes the first sliding coil (simply referred to as a first coil) 81 and the second sliding coil (simply referred to as a second slide coil) 82 wound around the outer peripheral surface of the rectangular bobbin 53 at the center portion of the sleeve body 50, and an interlinkage magnetic field generating body (the sliding magnet 83 and the inner case 63) configured to generate an interlinkage magnetic field in the first coil 81 and the second coil 82, and the magnetic drive mechanism includes the first coil 81, the second coil 82, and the interlinkage magnetic field generating body.

The plurality of (in this case, three) rib-like projections 55 are formed along the circumferential direction in the rectangular bobbin 53 of the sleeve body 50, and the first coil 81 and the second coil 82 are wound in the circumferential direction between the rib-like projections 55. Therefore, the first coil 81 and the second coil 82 are wound around the outer periphery of the rectangular bobbin 53 of the sleeve body 50 side-by-side in the Z-axis direction. In addition, the first coil 81 and the second coil 82 are formed with a predetermined width in the longitudinal direction (the Z-axis direction) of the sleeve body 50. Therefore, each of the first coil 81 and the second coil 82 has a planar portion on each of the four surfaces of the rectangular bobbin 53, and the four planar portions are arranged at the one side +X and the other side −X in the X-axis direction, and at the one side +Y and the other side −Y in the Y-axis direction respectively.

The interlinkage magnetic field generating body includes the four sliding magnets 83 facing each other on the outer peripheral side with respect to the first coil 81 and the second coil 82. As illustrated in FIG. 6 and FIG. 7, the four sliding magnets 83 are fixed on an inner surface of the tubular body 64 of the inner case 63 integrally arranged with the tubular holder 60. The tubular body 64 of the inner case 63 is formed in a rectangular tube shape, and each of the sliding magnets 83 is fixed on the inner surface of each of the four side plate units 641 of the tubular body 64. Since each of the side plate units 641 of the tubular body 64 is respectively arranged at the one side +X and the other side −X in the X-axis direction, and at the one side +Y and the other side −Y in the Y-axis direction, each of the sliding magnets 83 is respectively arranged at the one side +X and the other side-X in the X-axis direction, and at the one side +Y and the other side −Y in the Y-axis direction.

It is noted that in the present embodiment, the inner case 63 is formed of a ferromagnetic material such as a steel plate and is used as a yoke of the sliding drive mechanism 80 being a magnetic drive mechanism. The tubular body 64 of the inner case 63 covers the outer surfaces of the first coil 81 and the second coil 82, and reduces the leakage flux from the magnetic path configured between the sliding magnets 83 and the first coil 81 and the second coil 82. As a result of such a configuration, it is possible to improve the linearity between the movement amount of the sleeve body 50 and the current circulated through the first coil 81 and the second coil 82.

In the present embodiment, each of the four sliding magnets 83 is formed in a rectangular plate shape, and is fixed on the inner surface of the side plate unit 641 in a side portion avoiding the four corners of the inner case 63. Therefore, each of the sliding magnets 83 faces each planar portion of the first coil 81 and the second coil 82 wound around the outer surface of the sleeve body 50. The inner case 63, together with the sliding magnets 83, constitutes an interlinkage magnetic field generating body that generates an interlinkage magnetic field in the first coil 81 and the second coil 82 held by the sleeve body 50.

In this case, each of the four sliding magnets 83 is divided into two in the Z-axis direction, and the inner surface and the outer surface are magnetized to different poles in each of the sliding magnets 83. For example, in the sliding magnets 83, the inner surface is magnetized to the N pole and the outer surface is magnetized to the S pole in the upper half, and the inner surface is magnetized to the S pole and the outer surface is magnetized to the N pole in the lower half. Also, on the inner surface of the sliding magnet 83, the magnetic poles 831, 832 different vertically in poles via the magnetization polarization line 833 face the first coil 81 and the second coil 82 of the sleeve body 50. Therefore, the winding direction of the coil wire is opposite between the first coil 81 and the second coil 82.

(Assembly of Optical Unit 100)

As illustrated in FIG. 7, the lens module 120 and the sensor module 130 are incorporated into the shake correction apparatus 110 configured as described above, and thus the optical unit 100 illustrated in FIG. 1 and FIG. 2 is configured. In the present embodiment, a space extending from the one side +Z to the other side −Z is formed on the Z-axis in the shake correction apparatus 110. Therefore, the lens module 120 is inserted from the one side +Z in the Z-axis direction, and the male threaded portion 121 formed on the outer periphery thereof is screwed into the female threaded portion 54 of the sleeve body 50 to mount the lens module 120 in the inner space of the sleeve body 50. On the other hand, the top plate unit 135 of the sensor cover 133 of the sensor module 130 abuts the bottom plate unit 68 of the bottom frame 67 from the other side −Z in the Z-axis direction, and the pins 138 of the top plate unit 135 are fitted into the holes 682 of the bottom plate unit 68 of the bottom frame 67 and fixed by an adhesive or the like to mount the sensor module 130. Even after the sensor module 130 is mounted on the bottom frame 67, the circuit board 131 is exposed at the −Z side in the Z-axis direction, which makes wiring work for the circuit board 131 easier.

It is noted that before incorporating the lens module 120 and the sensor module 130, the shake correction apparatus 110 is cleaned by using ultrasonic waves or the like. Since the lens module 120 and the sensor module 130 are sealed and integrated, it is possible to facilitate the installation work thereof and also to perform the installation work even if it is not a clean room environment.

In the optical unit 100 thus assembled, the optical axis L of the lens module 120 and the sensor module 130 is arranged in the Z-axis direction of the shake correction apparatus 110. Moreover, if a current in a predetermined direction is circulated through the first coil 81 and the second coil 82 in the magnetic fields generated by the sliding magnets 83 of the sliding drive mechanism 80, the lens module 120 integrated with the sleeve body 50 can be moved in the Z-axis direction (the direction of the optical axis L) by the electromagnetic force thereof, and the amount of current circulated through the first coil 81 and the second coil 82 is adjusted to adjust the focal position with respect to the sensor module 130.

On the other hand, with respect to pitching and yawing, current is circulated through the oscillating coils 42 in the magnetic fields generated by the oscillating magnets 41 of the shake correction drive mechanism 40 to generate an electromagnetic force and cause the movable body 20 to oscillate around the first axial line R1 or the second axial line R2 by the electromagnetic force to control the form of the lens module 120 and the sensor module 130 in the movable body 20.

(Effect)

In the optical unit (optical unit with a shake correction function) 100 thus configured, since the movable frame 31 constituting the gimbal mechanism 30 is radially outside the shake correction drive mechanism 40, the shake correction drive mechanism 40 can be placed close to the optical axis L. Therefore, the distance in the radial direction from the oscillation center position 36 of the movable body 20 up to the shake correction drive mechanism 40 can also be shortened. This makes it possible to reduce the oscillation displacement of the movable body 20 oscillating in the shake correction drive mechanism 40 to reduce the inertia of the movable body 20. Therefore, it is possible to improve responsiveness at the time of shake correction and to further reduce the power consumption. Further, as described earlier, since the oscillation displacement of the movable body 20 can be reduced, particularly, the size in the direction of the optical axis L can be reduced, because of which the optical unit 100 can be reduced in size.

In addition, although the optical unit 100 includes not only the shake correction drive mechanism 40 but also the sliding drive mechanism 80, since the oscillating magnets 83 of the sliding drive mechanism 80 and the swinging magnets 41 of the shake correction drive mechanism 40 are provided in the same tubular holder (the sliding holder) 60, the positional relationship between the sliding magnets 83 and the swinging magnets 41 does not change during the oscillation of the movable body 20 and the sliding movement of the sleeve body (the sliding sleeve body) 50. As a result, the drive of each of the shake correction drive mechanism 40 and the sliding drive mechanism 80 is not hindered by the magnets (magnetic forces) of the other drive mechanisms. Therefore, it is possible to stably generate the torque necessary for causing oscillation of the movable body 20 and the sliding movement of the sleeve body 50. Thus, as a result of the present configuration, while the responsiveness of shake correction and autofocus can be improved, power saving can be achieved.

Further, in the optical unit 100 according to the present embodiment, since the biasing directions of the four oscillation support points constituting the gimbal mechanism 30 are aligned in one direction, the pressure exerted from the four oscillation support points can be uniformly applied to the movable frame 31, and the movable frame 31 can be prevented from becoming distorted. Therefore, it is possible to stably support the movable body 20 with respect to the fixed body 10 without generating a gap between the movable frame 31 and the movable body 20, and between the movable frame 31 and the fixed body 10. Therefore, it is possible to prevent the movable frame 31 from coming off and to smoothly drive the movable body 20, so that the responsiveness at the time of shake correction can be further improved.

Further, as described earlier, in the present embodiment, since the four oscillation support points are arranged radially inside the movable frame 31, the movable body 20 need not extend up to the outer side of the movable frame 31. Therefore, the size in the radial direction of the movable body 20 can be reduced, and the optical unit 100 with a shake correction function can be further reduced in size.

It is noted that in the above embodiment, a configuration in which the four oscillation support points are arranged radially inside the movable frame 31, and the movable frame 31 is biased in one direction from the inner side to the outer side in the radial direction is assumed. However, a configuration in which the four oscillation support points are arranged radially outside the movable frame 31, and the movable frame 31 is biased in one direction from the outer side to the inner side in the radial direction may be assumed. In either case, the biasing directions of the four oscillation support points are aligned in one direction to prevent the movable frame 31 from being distorted by the pressurization of the four oscillation support points, and thus facilitate smooth driving of the movable body 20.

Further, in the optical unit 100 of the present embodiment, the support plate unit (fixed body-side drive holding unit) 112 is provided in the fixed body 10 supporting the movable body 20, and the wall unit (movable body-side drive holding unit) 611 is provided in the movable body 20 having the lens. Therefore, the shake correction drive mechanism 40 can be configured simultaneously with the assembly of the fixed body 10 and the movable body 20. Moreover, since the support plate unit 112 of the fixed body 10 is arranged radially inside the movable frame 31, and the wall unit 611 of the movable body 20 is arranged radially inside the support plate unit 112, it is possible to sequentially assemble the fixed body 10 and the movable body 20 from the inner side in the radial direction. Further, since the spring pieces (elastic members) 331 constituting the gimbal mechanism 30 are formed in a U-shaped longitudinal section opening at one side, and the open side of the spring pieces 331 is aligned toward one side in the Z-axis direction, it is possible to easily incorporate the spring pieces 331 from one side during assembly. Therefore, the optical unit 100 can be easily assembled.

Second Embodiment

Figure 18:
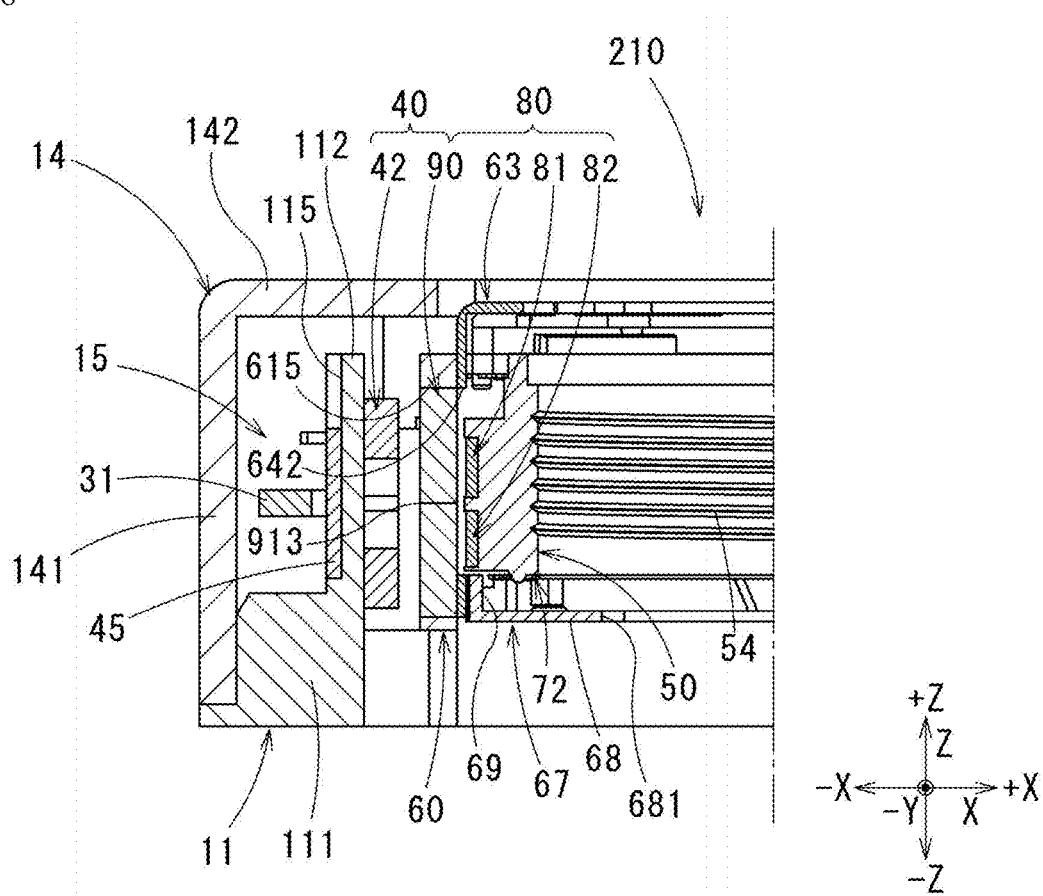
FIG. 18 is a longitudinal sectional view in which half of a shake correction apparatus constituting an optical unit with a shake correction function according to a second embodiment is omitted.

In the first embodiment described above, the oscillating magnet 41 of the shake correction drive mechanism 40 is fixed on an outer surface of the tubular holder 60, and the sliding magnet 83 of the sliding drive mechanism 80 is fixed on an inner surface of the inner case 63 in the tubular holder 60, but the two magnets may be integrated into a common one (common magnet). In this second embodiment, the main parts of a shake correction apparatus 210 are illustrated in FIG. 18, but the same reference numerals are given to the same elements as those of the first embodiment, and the explanation will be simplified. Further, in the second embodiment, the optical unit (optical unit with a shake correction function) also includes the shake correction apparatus 210, a lens module (not illustrated), and a sensor module (not illustrated), and is configured by incorporating a lens module and a sensor module in the shake correction apparatus, however, in the following main description, as illustrated in FIG. 18, description will be made in a state before assembling the lens module and the sensor module in the shake correction apparatus 210.

As illustrated in FIG. 18, in the shake correction apparatus 210, a fixing hole 615 for holding a magnet (corresponding to the common magnet of at least an embodiment of the present invention) 90 is provided in a penetrating state in the tubular holder (sliding holder) 60, and the magnet 90 is fixed on to the fixing hole 615 in a fitted state. Similar to the oscillating magnet 41 of the shake correction drive mechanism 40 in the first embodiment, the magnet 90 is magnetized to different poles on the outer surface side and the inner surface side, and is also magnetized to two different poles in the Z-axis direction with the magnetization polarization line 913 as the boundary. Further, both the front and back surfaces of the magnet 90 are exposed on the outer surface side and the inner surface side of the tubular holder 60, respectively.

Also, a notch 642 for exposing the inner surface of the magnet 90 of the tubular holder 60 is formed in the inner case 63 integrally arranged on an inner side of the tubular holder 60, and the magnet 90 faces the first coil 81 and the second coil 82 on the outer surface of the sleeve body 50 through the notch 642. In this case, the sleeve body 50 increases the outer peripheral surface of the rectangular bobbin 53 in the radial direction so that the first coil 81 and the second coil 82 are arranged close to the magnet 90.

That is, in the second embodiment, the oscillating coil 42, the magnet 90, the sliding coils (the first coil 81 and the second coil 82) are sequentially provided from the outer side to the inner side in the radial direction, and the magnet 90 arranged at the center position in the radial direction is provided as a common magnet for the shake correction drive mechanism 40 and the sliding drive mechanism 80. Therefore, the outer surface of the magnet 90 faces the oscillating coil 42, and the inner surface thereof faces the sliding coils 81 and 82. Further, the shake correction drive mechanism 40 includes the oscillating coil 42 arranged on the outer side and the magnet 90 arranged at the center, and the sliding drive mechanism 80 includes the magnet 90 arranged at the center, the sliding coils (the first coil 81 and the second coil 82) arranged on an inner side, and the inner case 63 serving as a yoke.

Same as in the first embodiment, the oscillating coil 42 and the magnet 90 of the shake correction drive mechanism 40 are arranged such that the height positions of the coil center of the oscillating coil 42 and the magnetization polarization line 913 of the magnet 90 in the Z-axis direction coincide. Further, in the case of the sliding coils 81 and 82 and the magnet 90, the height positions of the intermediate position between the first coil 81 and the second coil 82 of the sliding coils, and the magnetization polarization line 913 of the magnet 90 in the Z-axis direction also coincide.

In the first embodiment, as illustrated in FIG. 6 and FIG. 7, since the bottom frame 67 and the rear end spring member 72 or the like are provided on the inner periphery portion of the inner case 63, the height of the sliding magnet 83 provided on the inner surface of the inner case 63 is less as compared to the oscillating magnet 41 of the shake correction drive mechanism 40. On the other hand, in the second embodiment, by having the common magnet for the shake correction drive mechanism 40 and the sliding drive mechanism 80, the magnet 90 can be provided on an outer side of the inner case 63, and the magnet 90 having a large height can be used as is as the magnet of the sliding drive mechanism 80. Therefore, in the first embodiment, the height positions of the magnetic polarization line 833 of the sliding magnet 83 of the sliding drive mechanism 80, and the intermediate position between the first coil 81 and the second coil 82 are shifted and arranged in the Z-axis direction to ensure linearity, however, in the second embodiment, since the magnet 90 is large, even if the height positions of the magnetic polarization line 913 of the magnet 90, and the intermediate position between the first coil 81 and the second coil 82 in the Z-axis direction are the same, a large driving force (electromagnetic force) can be applied to the sliding coils 81 and 82, and a large driving force can be generated in the entire sliding range. Therefore, it is possible to achieve power saving because of a large driving force.

It is noted that the magnetization polarization line 913 of the magnet 90 and the intermediate position in the Z-axis direction between the sliding coils 81 and 82 may not be at the same height.

In this second embodiment, the oscillating magnet of the shake correction drive mechanism 40 and the sliding magnet of the sliding drive mechanism 80 are a common magnet as an integrated magnet 90 to reduce the installation space thereof and thus reduce the number of components and delete a part of the wall of the tubular holder 60 and the inner case 63, as compared with a case where both the magnets are separately provided. Therefore, it is possible to reduce the size of the shake correction apparatus 210, and thus reduce the size of the optical unit with a shake correction function.

At least an embodiment is not limited to the above embodiment, and it is possible to apply various modifications without departing from the spirit of at least an embodiment of the present invention.

For example, the gimbal mechanism 30 adopts a structure where the spherical bodies 32 fixed to the movable frame 31 are brought into contact with the contact spring 33, however the spherical bodies may not necessarily be needed, and it is possible to adopt a structure where a spherical front end face formed by spherically shaping the front end face of a rod-shaped member or the like is brought into contact with the contact spring.

The two axial lines R1 and R2 of the gimbal mechanism 30 are perpendicular to the optical axis L, and are also perpendicular to each other, however, the two axial lines R1 and R2 may not necessarily be in a perpendicular state, and may be arranged to intersect the optical axis L at an angle other than 90°, and intersect each other at an angle other than 90°. In such a case, the amount of oscillation around each of the axial lines R1 and R2 may be set according to the angle of intersection.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function, comprising:
    a movable body comprising a lens and an imaging element;
    a fixed body configured to support the movable body;
    a gimbal mechanism configured to oscillatably support the movable body with respect to the fixed body around two axial lines intersecting an optical axis and intersecting each other; and
    a shake correction drive mechanism configured to cause the movable body to oscillate with respect to the fixed body around the two axial lines, wherein
    the shake correction drive mechanism comprises an oscillating magnet, and an oscillating coil structured to generate an electromagnetic force within a magnetic field of the oscillating magnet,
    the gimbal mechanism comprises an annular movable frame surrounding a periphery of the movable body, and four oscillation support points supporting the movable frame with respect to the movable body and the fixed body on the two axial lines, and
    the movable frame is arranged outwardly in a radial direction perpendicular to the optical axis from the shake correction drive mechanism.

2. The optical unit with a shake correction function according to claim 1, wherein the fixed body comprises a fixed body-side drive holding unit configured to hold either the oscillating magnet or the oscillating coil radially inside the movable frame, and
    the movable body comprises a movable body-side drive holding unit configured to hold the other one of the oscillating magnet and the oscillating coil at a position radially inside the fixed body-side drive holding unit and facing the fixed body-side drive holding unit.

3. The optical unit with a shake correction function according to claim 1, wherein the movable frame and the movable body are supported by two oscillation support points arranged to form a pair on a first axial line being one of the two axial lines, out of the four oscillation support points, and
    the movable frame and the fixed body are supported by two oscillation support points arranged to form a pair on a second axial line being the other one of the two axial lines, out of the four oscillation support points.

4. The optical unit with a shake correction function according to claim 1, wherein the movable body comprises: a sliding sleeve body having the lens; a sliding holder arranged radially outside the sliding sleeve body and having the oscillating magnet; a slide support mechanism configured to movably support the sliding sleeve body in the optical-axis direction with respect to the sliding holder; and a sliding drive mechanism configured to move the sliding sleeve body in the optical-axis direction with respect to the sliding holder, and
    the sliding drive mechanism comprises: a sliding magnet to be attached to the sliding holder; and a sliding coil to be attached to the sliding sleeve body, the sliding coil structured to generate an electromagnetic force within a magnetic field of the sliding magnet.

5. The optical unit with a shake correction function according to claim 4, wherein the fixed body is provided with a magnetic member facing the magnetization polarization line of the oscillating magnet in the direction perpendicular to the axial direction of the sliding holder.

6. The optical unit with a shake correction function according to claim 4, wherein the oscillating magnet and the sliding magnet are integrally formed as a common magnet for the shake correction drive mechanism and the sliding drive mechanism.

7. The optical unit with a shake correction function according to claim 6, wherein the common magnet comprises a magnetization polarization line formed at the center position in the optical-axis direction of the sliding holder, and the center position in the direction along the optical-axis direction of the sliding holder in the oscillating coil and the sliding coil and the magnetization polarization line are arranged side-by-side in a radial direction perpendicular to the optical-axis direction.

8. The optical unit with a shake correction function according to claim 1, wherein the four oscillation support points are configured to bias the movable frame with respect to the movable body and the fixed body either radially inwardly or outwardly.

9. The optical unit with a shake correction function according to claim 8, wherein the optical unit comprises four elastic members for biasing the four oscillation support points radially inwardly or outwardly, and each of the elastic members is formed in a U-shaped longitudinal section opening at one side, and the open side is aligned toward one direction in the optical-axis direction.

10. The optical unit with a shake correction function according to claim 8, wherein the four oscillation support points are arranged radially inside the movable frame.

11. The optical unit with a shake correction function according to claim 10, wherein the movable frame and the movable body are supported by two oscillation support points arranged to form a pair on a first axial line being one of the two axial lines, out of the four oscillation support points, and the movable frame and the fixed body are supported by two oscillation support points arranged to form a pair on a second axial line being the other one of the two axial lines, out of the four oscillation support points.

12. The optical unit with a shake correction function according to claim 11, wherein the movable body comprises: a sliding sleeve body having the lens; a sliding holder arranged radially outside the sliding sleeve body and having the oscillating magnet; a slide support mechanism configured to movably support the sliding sleeve body in the optical-axis direction with respect to the sliding holder; and a sliding drive mechanism configured to move the sliding sleeve body in the optical-axis direction with respect to the sliding holder, and the sliding drive mechanism comprises: a sliding magnet to be attached to the sliding holder; and a sliding coil to be attached to the sliding sleeve body, the sliding coil structured to generate an electromagnetic force within a magnetic field of the sliding magnet.

13. The optical unit with a shake correction function according to claim 12, wherein the fixed body is provided with a magnetic member facing the magnetization polarization line of the oscillating magnet in the direction perpendicular to the axial direction of the sliding holder.

14. The optical unit with a shake correction function according to claim 12, wherein the oscillating magnet and the sliding magnet are integrally formed as a common magnet for the shake correction drive mechanism and the sliding drive mechanism.

15. The optical unit with a shake correction function according to claim 14, wherein the common magnet comprises a magnetization polarization line formed at the center position in the optical-axis direction of the sliding holder, and the center position in the direction along the optical-axis direction of the sliding holder in the oscillating coil and the sliding coil and the magnetization polarization line are arranged side-by-side in a radial direction perpendicular to the optical-axis direction.

\* \* \* \* \*